(12) United States Patent
Lee et al.

(10) Patent No.: US 10,878,677 B2
(45) Date of Patent: Dec. 29, 2020

(54) METHOD OF CONTROLLING PANNING AND TILTING OF SURVEILLANCE CAMERA USING EDGE VALUE

(71) Applicant: Hanwha Techwin Co., Ltd., Seongnam-si (KR)

(72) Inventors: Sang Wook Lee, Seongnam-si (KR); Jae Woon Byun, Seongnam-si (KR); Dae Bong Kim, Seongnam-si (KR); Ku Hyeon Jeong, Seongnam-si (KR)

(73) Assignee: Hanwha Techwin Co., Ltd., Seoul (KR)

( * ) Notice: Subject to any disclaimer, the term of this patent is extended or adjusted under 35 U.S.C. 154(b) by 28 days.

(21) Appl. No.: 16/037,859

(22) Filed: Jul. 17, 2018

(65) Prior Publication Data

US 2018/0342137 A1    Nov. 29, 2018

Related U.S. Application Data

(63) Continuation of application No. 15/952,153, filed on Apr. 12, 2018, now abandoned.

(30) Foreign Application Priority Data

Apr. 14, 2017 (KR) .................. 10-2017-0048533
Mar. 12, 2018 (KR) .................. 10-2018-0028850

(51) Int. Cl.
*H04N 5/232* (2006.01)
*G08B 13/196* (2006.01)
(Continued)

(52) U.S. Cl.
CPC .......... *G08B 13/1963* (2013.01); *G06T 7/13* (2017.01); *H04N 5/232* (2013.01); *H04N 5/23299* (2018.08); *H04N 7/183* (2013.01)

(58) Field of Classification Search
CPC .......... H04N 5/23296; H04N 5/23299; H04N 5/232945; H04N 5/232; G06T 7/13
See application file for complete search history.

(56) References Cited

U.S. PATENT DOCUMENTS 5,929,904 A    7/1999  Uchida
6,687,386 B1 *  2/2004  Ito ...................... G06K 9/00785
                                                    382/103
(Continued)

FOREIGN PATENT DOCUMENTS

CN    101014978    8/2007
CN    105513072    4/2016
(Continued)

OTHER PUBLICATIONS

Office Action dated Nov. 4, 2020 issued to Chinese Patent Application No. 201810322966.

*Primary Examiner* — Kelly L Jerabek
(74) *Attorney, Agent, or Firm* — H.C. Park & Associates, PLC

(57) ABSTRACT

A method of controlling panning of a surveillance camera configured to perform panning over a set angle during a preset mode includes: obtaining an edge value with respect to each pixel of an object captured image of a panning-completed time, the edge value being a difference between brightness of a left adjacent pixel thereof and brightness of a right adjacent pixel thereof; obtaining an object vertical-line number among vertical pixel lines of the object captured image, the object vertical-line number being a number of a vertical pixel line in which a sum of the edge values is largest; and correcting the panning such that the object vertical-line number coincides with a reference vertical-line number corresponding to the panning over the set angle.

14 Claims, 23 Drawing Sheets

(51) Int. Cl.
*G06T 7/13* (2017.01)
*H04N 7/18* (2006.01)

(56) References Cited

U.S. PATENT DOCUMENTS

| | | | |
|---|---|---|---|
| 7,856,137 B2 | 12/2010 | Yonezawa et al. | |
| 9,654,682 B2 | 5/2017 | Ohtani | |
| 2002/0172518 A1 | 11/2002 | Watson | |
| 2006/0193626 A1 | 8/2006 | Kim et al. | |
| 2012/0306736 A1* | 12/2012 | Thiruvengada | G06F 3/017 |
| | | | 345/156 |
| 2014/0253788 A1 | 9/2014 | Saito et al. | |
| 2015/0334356 A1* | 11/2015 | Kim | H04N 5/232 |
| | | | 348/143 |
| 2016/0241789 A1* | 8/2016 | Mayuzumi | H04N 5/247 |
| 2018/0069997 A1* | 3/2018 | Watanabe | G06T 7/13 |

FOREIGN PATENT DOCUMENTS

| | | |
|---|---|---|
| JP | 09-266547 | 10/1997 |
| JP | 11-341318 | 12/1999 |
| JP | 11-341335 | 12/1999 |
| JP | 2000-338534 | 12/2000 |
| JP | 2001-211692 | 8/2001 |
| JP | 2008-227576 | 9/2008 |
| JP | 2011-139196 | 7/2011 |
| JP | 2014-171344 | 9/2014 |
| JP | 2015-006480 | 1/2015 |
| JP | 2015-138132 | 7/2015 |
| JP | 2016-006480 | 1/2016 |
| KR | 10-2005-0111223 | 11/2005 |
| KR | 10-0708470 | 4/2007 |
| KR | 10-0925192 | 11/2009 |
| KR | 10-0927323 | 11/2009 |
| KR | 10-2012-0099932 | 9/2012 |
| KR | 10-1424151 | 8/2014 |

\* cited by examiner

FIG. 17

FIG. 22

METHOD OF CONTROLLING PANNING AND TILTING OF SURVEILLANCE CAMERA USING EDGE VALUE

CROSS-REFERENCE TO RELATED APPLICATIONS

This application is a Continuation of U.S. patent application Ser. No. 15/952,153, filed on Apr. 12, 2018, and claims priority from and the benefit of Korean Patent Applications No. 10-2017-0048533 filed on Apr. 14, 2017, and 10-2018-0028850 filed on Mar. 12, 2018, which are hereby incorporated by reference for all purposes as if fully set forth herein.

BACKGROUND

Field

Exemplary embodiments of the invention relate generally to a method of controlling panning and tilting of a surveillance camera, and more specifically, to a method of controlling panning and tilting of a surveillance camera configured to perform panning and/or tilting over a set angle during various operation modes.

Discussion of the Background

During a surveillance mode of a surveillance camera, a plurality of surveillance object regions designated by a user are periodically monitored by panning and/or tilting. For example, when a location coordinate is input by a user, a main controller inside the surveillance camera sets a pan angle and/or a tilt angle corresponding to the input location coordinate. After that, panning over the set pan angle and/or tilting over the set tilt angle are periodically performed.

During the surveillance mode of the surveillance camera, accuracy of panning and tilting is reduced due to backlash, out-of-phase, etc. of a panning mechanism or a tilting mechanism. In this case, a surveillance performance is reduced. Such a problem is conspicuous in a low-priced panning motor or tilting motor configured to perform an open loop control, but not when closed loop control is used.

Meanwhile, for the low-priced panning motor or tilting motor configured to perform an open loop control, a low-priced sensor assembly may be used.

The sensor assembly includes a rotation plate and a sensor. The rotation plate in which slits are arranged with a constant interval rotates depending on an operation of the panning mechanism or the tilting mechanism. The sensor may sense a location of the rotation plate and provide a binary signal to the main controller.

Therefore, the main controller of the surveillance camera may obtain an actual pan angle of a panning-completed time and/or an actual tilt angle of a tilting-completed time by using the sensor assembly, and correct the panning and/or tilting such that the actual pan angle and/or the actual tilt angle coincide with the set angles.

However, in the case where the panning motor and/or the tilting motor perform an open loop control, even though the sensor assembly is additionally used, a reduced accuracy of panning and tilting due to backlash, out-of-phase, etc. of the panning mechanism or the tilting mechanism still remains.

The above information disclosed in this Background section is only for understanding of the background of the inventive concepts, and, therefore, it may contain information that does not constitute prior art.

SUMMARY

One or more exemplary embodiments include a method of controlling panning and tilting of a surveillance camera, capable of solving a problem in which accuracy of panning and tilting is reduced due to backlash, out-of-phase, etc. of a panning mechanism or a tilting mechanism during a preset mode of the surveillance camera.

Additional aspects will be set forth in part in the description which follows and, in part, will be apparent from the description, or may be learned by practice of the presented embodiments.

According to one or more exemplary embodiments, a method of controlling panning of a surveillance camera configured to perform panning over a set angle during a preset mode includes: obtaining an edge value with respect to each pixel of an object captured image of a panning-completed time, the edge value being a difference between brightness of a left adjacent pixel thereof and brightness of a right adjacent pixel thereof; obtaining an object vertical-line number which is a number of a vertical pixel line in which sum of the edge values is largest among vertical pixel lines of the object captured image; and correcting the panning such that the object vertical-line number coincides with a reference vertical-line number corresponding to the panning over the set angle.

According to one exemplary embodiment, a method of controlling panning of a surveillance camera configured to perform panning over a set angle, including: obtaining an edge value with respect to each pixel of a plurality of preset partial blocks of an object captured image of a panning-completed time, wherein the edge value is a difference between brightness of a left adjacent pixel thereof and brightness of a right adjacent pixel thereof; obtaining an object vertical-line number with respect to each of the plurality of preset partial blocks, the object vertical-line number being a number of a vertical pixel line in which a sum of the edge values is the largest among vertical pixel lines; and correcting the panning such that the object vertical-line number coincides with a reference vertical-line number corresponding to the panning over the set angle with respect to each of the plurality of preset partial blocks.

The method of controlling panning of a surveillance camera configured to perform panning over a set angle, might also include: dividing a reference captured image of the panning-completed time into a plurality of partial blocks, and classifying the plurality of partial blocks into central partial blocks and peripheral partial blocks; obtaining an edge value with respect to each pixel of the reference captured image of the panning-completed time, wherein the edge value is a difference between brightness of a left adjacent pixel thereof and brightness of a right adjacent pixel thereof; calculating a sum of the edge values of each of the peripheral partial blocks while giving a high weight rate as a location of the peripheral partial blocks approaches an outermost part; and setting a preset number of partial blocks in an order based on the sum of the edge values from high to low among the peripheral partial blocks.

According to one exemplary embodiment, a method of controlling panning of a surveillance camera configured to perform panning over a set angle, the method including: after the panning is completed, obtaining values of automatic exposure parameters which have been applied to an object captured image; and when an average deviation of the values of the automatic exposure parameters and reference values is less than an upper limit value, obtaining an edge value with respect to each pixel of the object captured image, wherein the edge value is a difference between brightness of a left adjacent pixel thereof and brightness of a right adjacent pixel thereof, obtaining an object vertical-line number which is a number of a vertical pixel line in which a sum of the edge values is the largest among vertical pixel lines of the object captured image, and correcting the panning such that the object vertical-line number coincides with a reference vertical-line number corresponding to the panning over the set angle.

According to one exemplary embodiment, a method of controlling panning of a surveillance camera configured to perform panning over a set angle, the method including: obtaining an object pan angle by using a photo interrupter sensor assembly, wherein the object pan angle is an actual pan angle of a panning-completed time; when a difference between the object pan angle and the set angle exceeds a reference limit, performing first correction of the panning such that the object pan angle coincides with the set angle; and obtaining an edge value with respect to each pixel of an object captured image, wherein the edge value is a difference between brightness of a left adjacent pixel thereof and brightness of a right adjacent pixel thereof, obtaining an object vertical-line number which is a number of a vertical pixel line in which sum of the edge values is the largest among vertical pixel lines of the object captured image, and performing second correction of the panning such that the object vertical-line number coincides with a reference vertical-line number corresponding to the panning over the set angle.

According to another exemplary embodiment, a method of controlling tilting of a surveillance camera configured to perform tilting over a set angle, the method including: obtaining an edge value with respect to each pixel of an object captured image of a tilting-completed time, wherein the edge value is a difference between brightness of an upper adjacent pixel thereof and brightness of a lower adjacent pixel thereof; obtaining an object horizontal-line number which is a number of a horizontal pixel line in which a sum of the edge values is the largest among horizontal pixel lines of the object captured image; and correcting the tilting such that the object horizontal-line number coincides with a reference horizontal-line number corresponding to the tilting over the set angle.

According to one exemplary embodiment, a method of controlling tilting of a surveillance camera configured to perform tilting over a set angle, the method including: obtaining an edge value with respect to each pixel of a plurality of preset partial blocks of an object captured image of a tilting-completed time, wherein the edge value is a difference between brightness of an upper adjacent pixel thereof and brightness of a lower adjacent pixel thereof; obtaining an object horizontal-line number with respect to each of the plurality of preset partial blocks, wherein the object horizontal-line number is a number of a horizontal pixel line in which a sum of the edge values is the largest among horizontal pixel lines; and correcting the tilting such that the object horizontal-line number coincides with a reference horizontal-line number corresponding to the tilting over the set angle with respect to each of the plurality of preset partial blocks.

The method of controlling tilting of a surveillance camera configured to perform tilting over a set angle, might also include: dividing a reference captured image of the tilting-completed time into a plurality of partial blocks, and classifying the plurality of partial blocks into central partial blocks and peripheral partial blocks; obtaining an edge value with respect to each pixel of the reference captured image, wherein the edge value is a difference between brightness of an upper adjacent pixel thereof and brightness of a lower adjacent pixel thereof; calculating a sum of the edge values of each of the peripheral partial blocks while giving a high weight rate as a location of the peripheral partial blocks approaches an outermost part; and setting a preset number of partial blocks in an order based on the sum of the edge values from high to low among the peripheral partial blocks.

According to one exemplary embodiment, a method of controlling tilting of a surveillance camera configured to perform tilting over a set angle, the method including: after the tilting is completed, obtaining values of automatic exposure parameters which have been applied to an object captured image; and when an average deviation of the values of the automatic exposure parameters and reference values is less than an upper limit value, obtaining an edge value with respect to each pixel of the object captured image, wherein the edge value is a difference between brightness of an upper adjacent pixel thereof and brightness of a lower adjacent pixel thereof, obtaining an object horizontal-line number which is a number of a horizontal pixel line in which a sum of the edge values is the largest among horizontal pixel lines of the object captured image, and correcting the tilting such that the object horizontal-line number coincides with a reference horizontal-line number corresponding to the tilting over the set angle.

According to another exemplary embodiment, a method of controlling tilting of a surveillance camera configured to perform tilting over a set angle, the method including: obtaining an object tilt angle by using a photo interrupter sensor assembly, the object tilt angle being an actual tilt angle of a tilting-completed time; when a difference between the object tilt angle and the set angle exceeds a reference limit, performing first correction of the tilting such that the object tilt angle coincides with the set angle; and obtaining an edge value with respect to each pixel of an object captured image, wherein the edge value is a difference between brightness of an upper adjacent pixel thereof and brightness of a lower adjacent pixel thereof, obtaining an object horizontal-line number which is a number of a horizontal pixel line in which a sum of edge values is the largest among horizontal pixel lines of the object captured image, and performing second correction of the tilting such that the object horizontal-line number coincides with a reference horizontal-line number corresponding to the tilting over the set angle.

According to yet another exemplary embodiment, a method of controlling panning and tilting of a surveillance camera configured to perform panning over a set angle and tilting over a set angle, the method including: when the panning and tilting are completed, detecting an edge line from an object captured image; and correcting the panning and the tilting such that the detected edge line moves to a reference location.

The method of controlling panning and tilting of a surveillance camera configured to perform panning over a set angle and tilting over a set angle, might also include: after the panning and the tilting are corrected, periodically determining whether the edge line of the object captured image deviates from the reference location; and when the edge line of the object captured image deviates from the reference location, correcting the panning and the tilting such that the edge line moves to the reference location.

The method of controlling panning and tilting of a surveillance camera configured to perform panning over a set angle and tilting over a set angle, wherein the reference location might be a location of an edge line detected from a reference captured image after the panning and the tilting are completed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 17 is exemplary masks for detecting an edge used in detection operation S1604 of FIG. 16.

FIG. 22 is an illustration of an example of a pixel detected in detection operation S2104 of FIG. 21.

DETAILED DESCRIPTION

Figure 1:
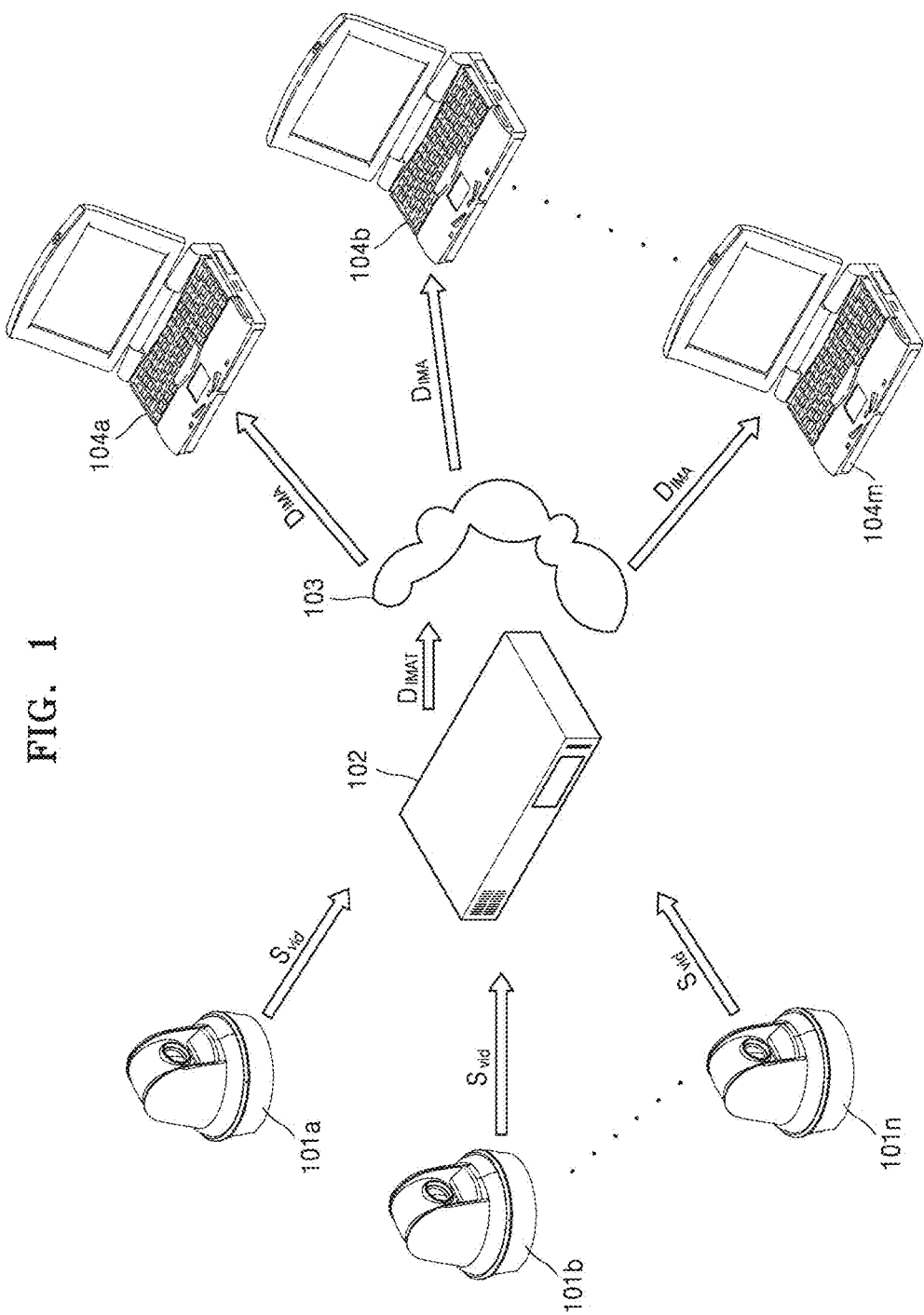
FIG. 1 is a perspective view of a surveillance system in which surveillance cameras are employed according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, analog-digital converter, main controller, video-signal generator, driver, microcomputer, photo interrupter (PI) sensor assembly, interface unit, other functional blocks and/or modules, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, analog-digital converter, main controller, video-signal generator, driver, microcomputer, photo interrupter (PI) sensor assembly, interface unit, other functional blocks and/or modules, and/or one or more components thereof may include or otherwise be associated with one or more memories (not shown) including code (e.g., instructions) configured to cause analog-digital converter, main controller, video-signal generator, driver, microcomputer, photo interrupter (PI) sensor assembly, interface unit, other functional blocks and/or modules, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein. Exemplary embodiments related to a preset mode among the exemplary embodiments are not limited to the preset mode. For example, exemplary embodiments are further applicable to a patrol mode or a manual mode. During the patrol mode, a plurality of preset modes are sequentially performed. During the manual mode, panning and/or tilting are performed on a point designated by a user.

FIG. 1 illustrates a surveillance system in which surveillance cameras 101a to 101n are employed according to an exemplary embodiment.

Referring to FIG. 1, the surveillance cameras 101a to 101n of the present exemplary embodiment transmit moving image signals Svid by capturing and recording to a digital video recorder 102.

The digital video recorder 102 converts analog moving image signals Svid from the surveillance cameras 101a to 101n to digital moving image data $D_{IMAT}$, stores the digital moving image data $D_{IMAT}$ as the converted results, and transmits the digital moving image data $D_{IMAT}$ to client terminals 104a to 104m through the Internet 103.

In FIG. 1, a reference code $D_{IMAT}$ denotes digital moving image data transmitted from the digital video recorder 102 to the Internet 103, and a reference code $D_{IMA}$ denotes digital moving image data from the Internet 103 to each of the client terminals 104a to 104m.

Figure 2:
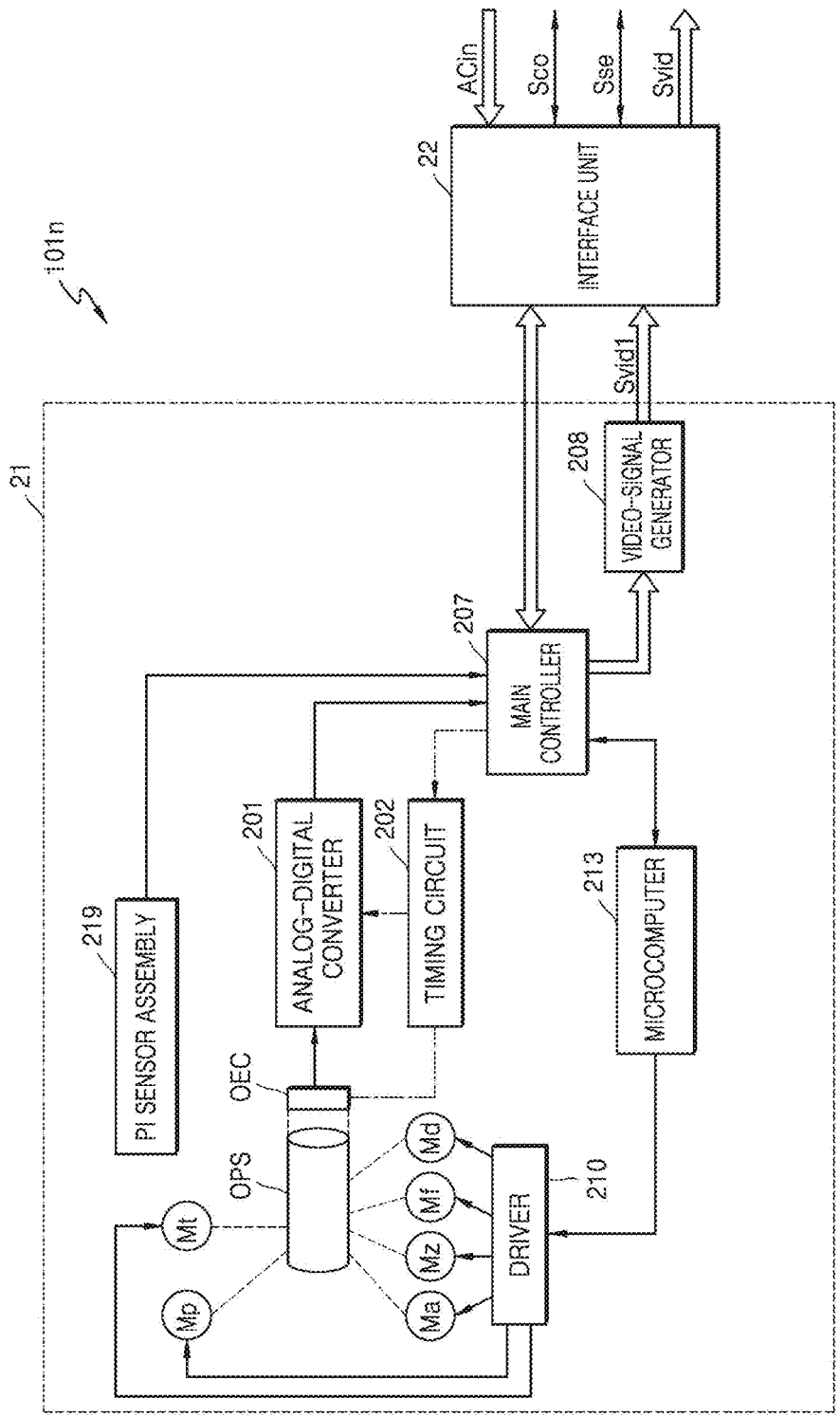
FIG. 2 is an illustration of an inner configuration of one of surveillance cameras of FIG. 1.

FIG. 2 illustrates an internal configuration of one 101n of the surveillance cameras of FIG. 1.

Referring to FIG. 2, the surveillance camera 101n of the present exemplary embodiment includes a main body 21 and an interface unit 22. In FIG. 2, a reference code ACin denotes an alternating current power source, a reference code Sco denotes a communication signal to/from the digital video recorder 102 (see FIG. 1), a reference code Sse denotes a communication signal to/from various sensors, and reference codes Svid1 and Svid denote video signals, respectively.

The main body 21 includes an optical system OPS, an optical-electric converter OEC, an analog-digital converter 201, a main controller 207, a video-signal generator 208, a driver 210, a microcomputer 213, an aperture motor Ma, a zoom motor Mz, a focus motor Mf, a filter motor Md, a panning motor Mp, a tilting motor Mt, and a photo interrupter sensor assembly 219.

The optical system OPS including lenses and an infrared filter optically processes light from an object. The lenses of the optical system OPS include a zoom lens and a focus lens.

The optic-electric converter OEC including a charged coupled device (CCD) or a complementary metal oxide semiconductor (CMOS) converts light from the optical system OPS to an electric analog signal. Here, the main controller 207 controls a timing circuit 202 to control operations of the optic-electric converter OEC and the analog-digital converter 201.

The analog-digital converter 201 converts an analog image signal from the optic-electric converter OEC to a digital image signal. More specifically, the analog-digital converter 201 removes high-frequency noise of an analog image signal from the optic-electric converter OEC, adjusts an amplitude of the analog image signal, and converts the analog image signal to digital image data. The digital image data is input to the main controller 207.

The main controller 207 converts a format of a digital image signal from the analog-digital converter 201 while controlling operations of, for example, the optical system OPS, the optic-electric converter OEC, and the analog-digital converter 201. More specifically, the main controller 207 processes a digital signal from the analog-digital converter 201, and generates digital image signals classified into brightness signals and chromaticity signals.

The video-signal generator 208 converts a digital image signal from the main controller 207 to a video signal Svid1 which is an analog image signal.

The main controller 207 transmits a video signal Svid1 from the video-signal generator 208 to the digital video recorder 102 (see FIG. 1) while communicating with the digital video recorder 102 (see FIG. 1) through the interface unit 22.

Meanwhile, the microcomputer 213 controls the driver 210 to drive the aperture motor Ma, the zoom motor Mz, the focus motor Mf, the filter motor Md, the panning motor Mp, and the tilting motor Mt.

The aperture motor Ma drives an aperture, the zoom motor Mz drives a zoom lens, and the focus motor Mf drives a focus lens. The filter motor Md drives an infrared blocking filter.

The panning motor Mp rotates the optical system OPS horizontally. The tilting motor Mt vertically rotates an assembly of the optical system OPS and the optic-electric converter OEC.

The PI sensor assembly 219 includes a rotation plate and a sensor. The rotation plate in which slits are arranged with a constant interval rotates depending on an operation of a panning mechanism or a tilting mechanism. The sensor senses a location of the rotation plate and provides a binary signal to the main controller 207. Therefore, the main controller 207 may obtain an actual rotation angle at a panning-completed time or a tilting-completed time.

Figure 3:
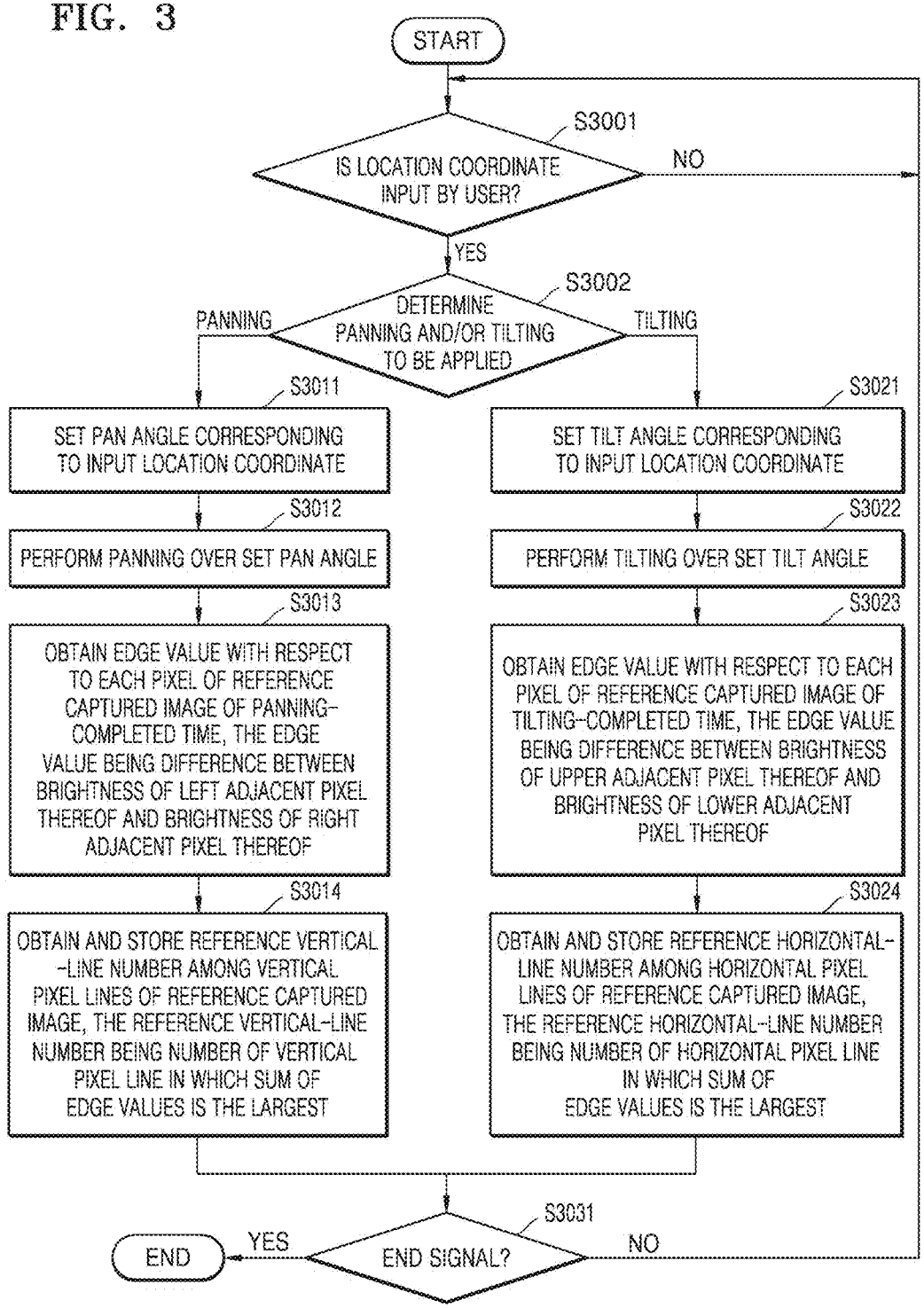
FIG. 3 is a flowchart of a method of obtaining, at a main controller of FIG. 2, a reference vertical-line number and a reference horizontal-line number when one surveillance object region is set during a preset mode according to an exemplary embodiment.
Figure 4:
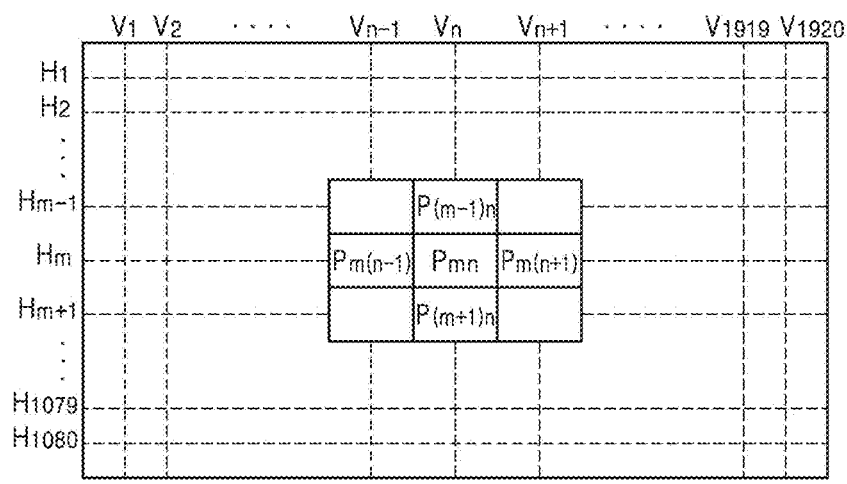
FIG. 4 is an exemplary reference captured image of a set surveillance object region for explaining operations S3013 and S3023 of FIG. 3.

FIG. 3 illustrates a method of obtaining, at the main controller 207 of FIG. 2, a reference vertical-line number and a reference horizontal-line number when one surveillance object region is set during a preset mode according to an exemplary embodiment. FIG. 4 is an exemplary reference captured image of a set surveillance object region for explaining operations S3013 and S3023 of FIG. 3.

Figure 5:
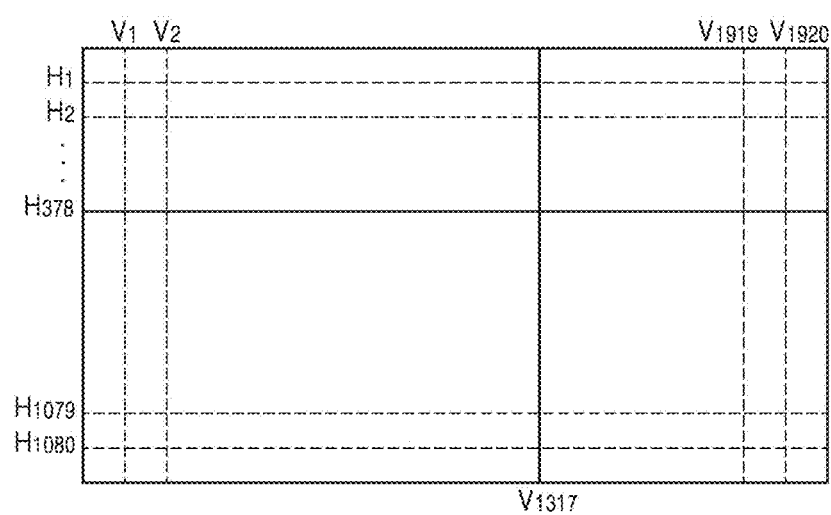
FIG. 5 is an exemplary reference captured image of a set surveillance object region for explaining operations S3014 and S3024 of FIG. 3.

FIG. 5 is an exemplary reference captured image of a set surveillance object region for explaining operations S3014 and S3024 of FIG. 3.

In FIGS. 4 and 5, a reference numeral 401 denotes a reference captured image of a set surveillance object region. Reference codes $V_1$ to $V_{1920}$ denote vertical pixel lines, $H_1$ to $H_{1080}$ denote horizontal pixel lines, and $P_{mn}$, $P_{(m+1)n}$, $P_{m(n-1)}$, and $P_{m(n+1)}$ denote pixels, respectively. Depending on the case, a range of the reference captured image 401 (there may be more than one) may be a specific region, not an entire region of a frame.

A method of obtaining, at the main controller 207 of FIG. 2, a reference vertical-line number and a reference horizontal-line number when one surveillance object region is set during a preset mode according to an exemplary embodiment is described with reference to FIGS. 3 to 5.

During a setting process of the preset mode, when a location coordinate of a central point of a surveillance object region is input by a user in operation S3001, the main controller 207 determines panning and/or tilting to be applied depending on the location coordinate in operation S3002.

In the case where only panning is performed, operations S3011 to S3014 are performed. In the case where only tilting is performed, operations S3021 to S3024 are formed. In the case where panning and tilting are performed, operations S3011 to S3014 and operations S3021 to S3024 are performed in a composite manner.

In operation S3011, the main controller 207 sets a pan angle corresponding to the input location coordinate. In operation S3012, the main controller 207 performs panning over the set pan angle. In operation S3013, the main controller 207 obtains an edge value with respect to each pixel of the reference captured image 401 of a panning-completed time, the edge value being a difference between brightness of a left adjacent pixel thereof and brightness of a right adjacent pixel thereof in operation S3013. For example, as shown in FIGS. 4 and 5, an edge value of a pixel $P_{mn}$ is a difference between brightness of a pixel $P_{m(n-1)}$ and brightness of a pixel $P_{m(n+1)}$. In operation S3014, the main controller 207 obtains and stores a reference vertical-line number, for example, "1317", which is a number of a vertical pixel line in which sum of edge values is the largest among vertical pixel lines $V_1$ to $V_{1920}$ of the reference captured image 401.

In operation S3021, the main controller 207 sets a tilt angle corresponding to the input location coordinate. In operation S3022, the main controller 207 performs tilting over the set tilt angle. In operation S3023, the main controller 207 obtains an edge value with respect to each pixel of the reference captured image 401 of a tilting-completed time, the edge value being a difference between brightness of an upper adjacent pixel thereof and brightness of a lower adjacent pixel thereof. For example, as shown in FIGS. 4 and 5, an edge value of a pixel $P_{mn}$ is a difference between brightness of a pixel $P_{(m-1)n}$ and brightness of a pixel $P_{(m+1)n}$. In operation S3024, the main controller 207 obtains and stores a reference horizontal-line number, for example, "378", which is a number of a horizontal pixel line in which sum of edge values is the largest among horizontal pixel lines $H_1$ to $H_{1080}$ of the reference captured image 401.

Operations S3001 to S3014, and/or S3001 to S3024 are repeatedly performed until an end signal occurs in operation S3031. That is, a reference horizontal-line number and a reference vertical-line number are set for another surveillance object region.

Figure 6:
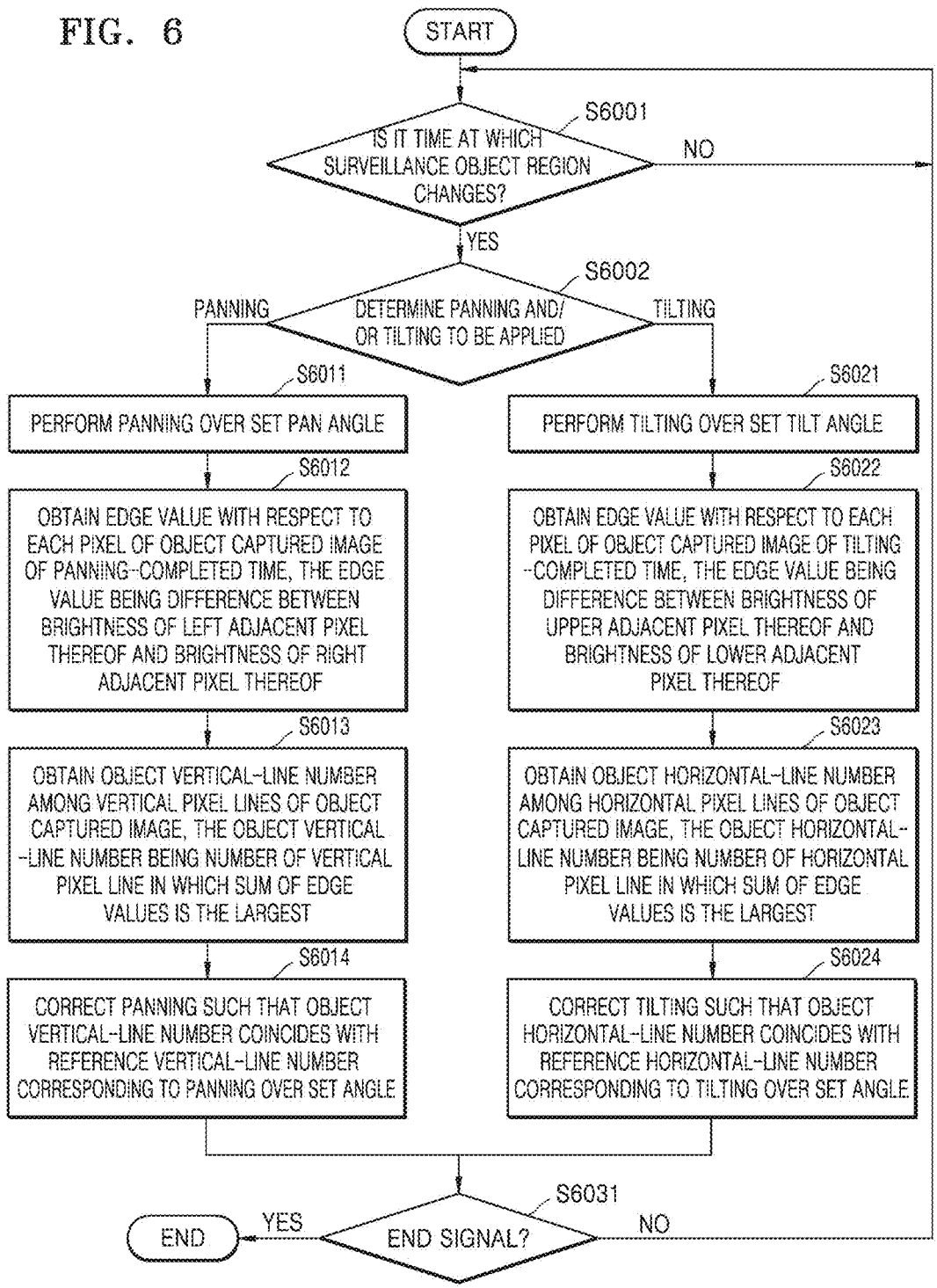
FIG. 6 is a flowchart of a method of controlling, at a main controller of FIG. 2, panning and tilting over set angles during a preset mode according to an exemplary embodiment.

FIG. 6 illustrates a method of controlling, by the main controller 207 of FIG. 2, panning and tilting over set angles during a preset mode according to an exemplary embodiment.

Figure 7:
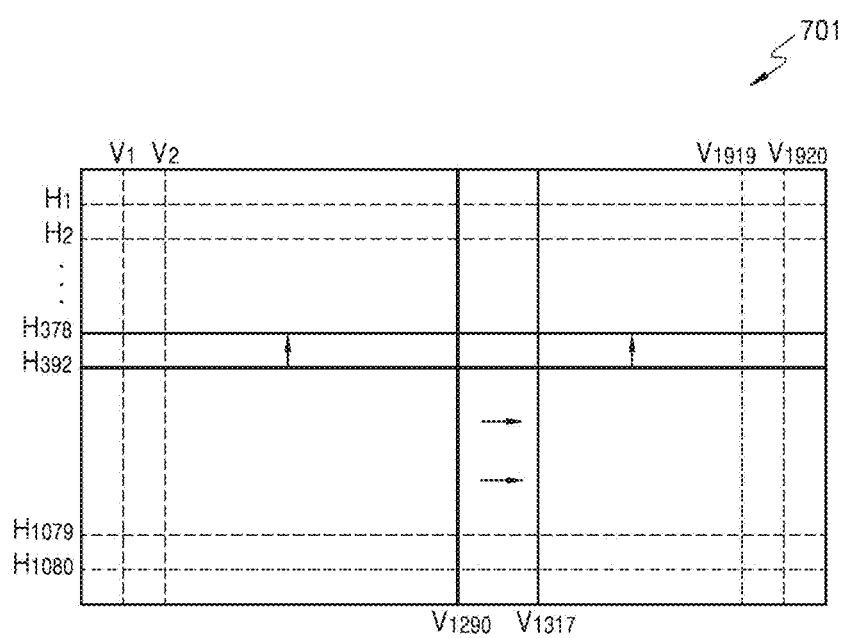
FIG. 7 is an exemplary object captured image of a panning and/or tilting-completed time for explaining operations S6014 and S6024 of FIG. 6.

FIG. 7 is an exemplary object captured image of a panning and/or tilting-completed time for explaining operations S6014 and S6024 of FIG. 6.

In FIG. 7, a reference number 701 denotes an object captured image of a panning and/or tilting-completed time. Reference codes $V_1$ to $V_{1920}$ denote vertical pixel lines, $H_1$ to $H_{1080}$ denote horizontal pixel lines, and $P_{mn}$, $P_{m(n-1)}$, $P_{(m+1)n}$, $P_{m(n-1)}$, and $P_{m(n+1)}$ denote pixels, respectively. Depending on the case, a range of the object captured image 701 may be a specific region, not an entire region of a frame.

A method of controlling, at the main controller 207 of FIG. 2, panning and tilting over set angles during a preset mode according to an exemplary embodiment is described with reference to FIGS. 6 and 7.

When a surveillance object region changes while the preset mode is executed in operation S6001, the main controller 207 determines panning and/or tilting to be applied depending on a location coordinate in operation S6002.

In the case where only panning is performed, operations S6011 to S6014 are performed. In the case where only tilting is performed, operations S6021 to S6024 are performed. In the case where panning and tilting are performed, operations S6011 to S6014 and operations S6021 to S6024 are performed in a composite manner.

In operation S6011, the main controller 207 performs panning over a set pan angle. In operation S6012, the main controller 207 obtains an edge value with respect to each pixel of the object captured image 701 of a panning-completed time, the edge value being a difference between brightness of a left adjacent pixel thereof and brightness of a right adjacent pixel thereof. In operation S6013, the main controller 207 obtains an object vertical-line number, for example as shown in FIG. 7, "1290", which is a number of a vertical pixel line in which sum of edge values is the largest among vertical pixel lines $V_1$ to $V_{1920}$ of the object captured image 701. In operation S6014, the main controller 207 corrects the panning such that the object vertical-line number, for example, "1290" coincides with the reference vertical-line number, for example, "1317" corresponding to the panning over the set angle.

For example, in the case where the panning motor Mp (see FIG. 2) is a step motor configured to control an open loop, and panning corresponding to six vertical pixel lines is performed per single step, four steps or five steps are additionally performed in order to correct panning corresponding to twenty seven vertical pixel lines. However, to correct panning corresponding to twenty eight vertical pixel lines, five steps, not four steps, are additionally performed.

In operation S6021, the main controller 207 performs tilting over a set tilt angle. In operation S6022, the main controller 207 obtains an edge value with respect to each pixel of the object captured image 701 of a tilting-completed time, the edge value being a difference between brightness of an upper adjacent pixel thereof and brightness of a lower adjacent pixel thereof. In operation S6023, the main controller 207 obtains an object horizontal-line number, for example as shown in FIG. 7, "392", which is a number of a horizontal pixel line in which sum of edge values is largest among horizontal pixel lines $H_1$ to $H_{1080}$ of the object captured image 701. In operation S6024, the main controller 207 corrects the tilting such that the object horizontal-line number, for example, "392", coincides with the reference horizontal-line number, for example, "378", corresponding to tilting over the set angle.

For example, in the case where the tilting motor Mt (see FIG. 2) is a step motor configured to control an open loop, and tilting corresponding to six horizontal pixel lines is performed per single step, two steps are additionally performed in order to correct tilting corresponding to fourteen horizontal pixel lines.

Operations S6001 to S6014, and/or S6001 to S6024 are repeatedly performed until an end signal occurs in operation S6031. That is, panning and/or tilting are performed on another surveillance object region.

Figure 8:
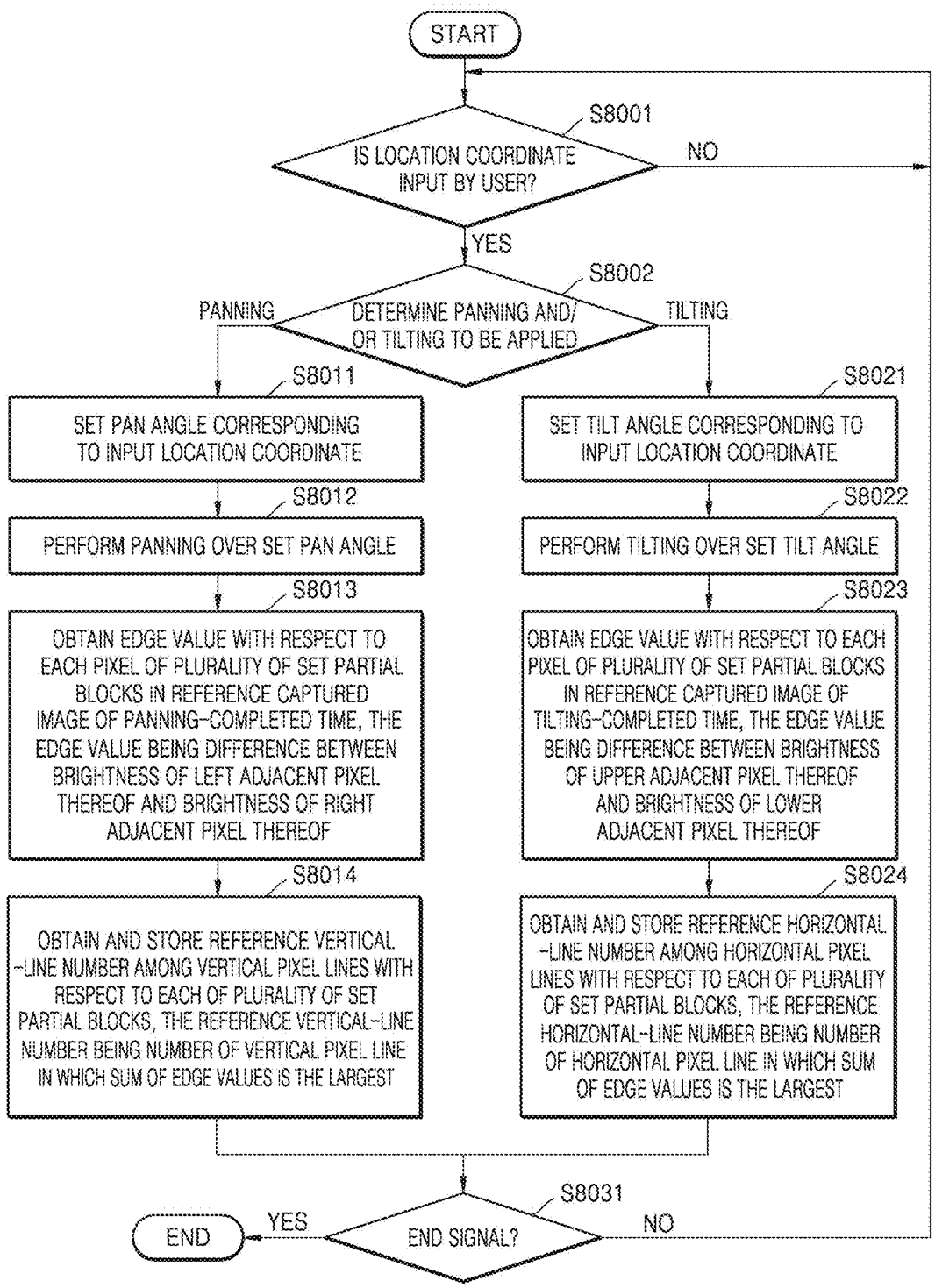
FIG. 8 is a flowchart of a method of obtaining, at a main controller of FIG. 2, a reference vertical-line number and a reference horizontal-line number with respect to each of a plurality of preset partial blocks when one surveillance object region is set during a preset mode according to an exemplary embodiment.
Figure 9:
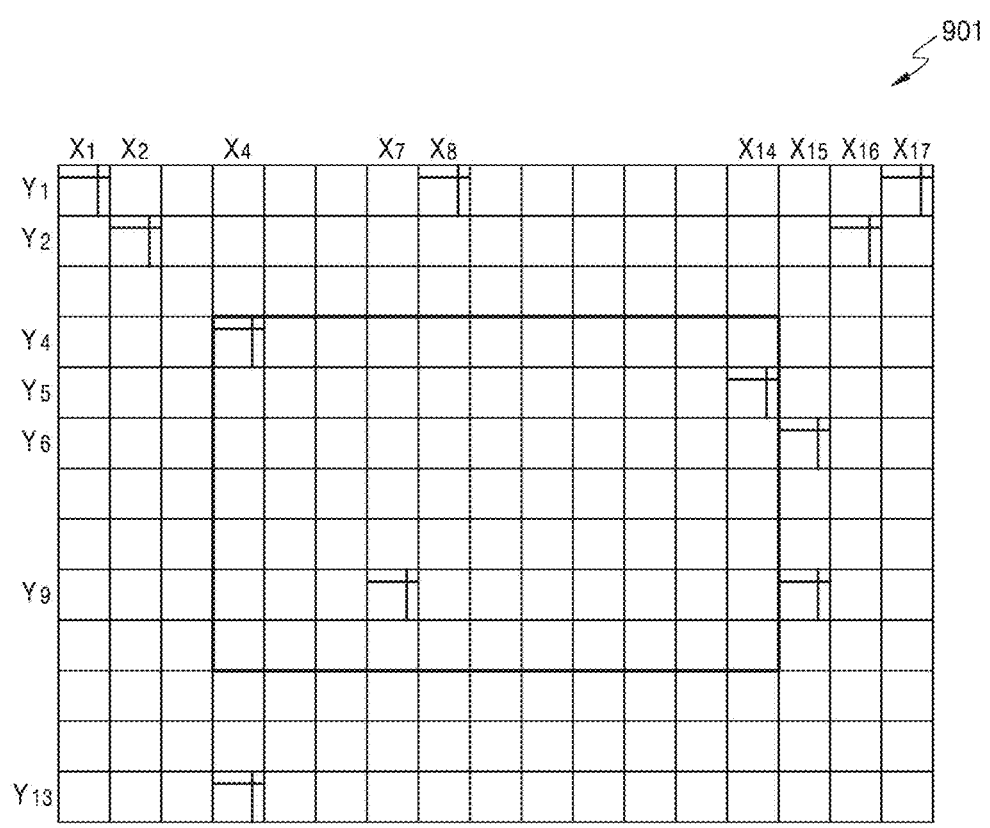
FIG. 9 is an exemplary reference captured image of a set surveillance object region for explaining operations S8014 and S8024 of FIG. 8.

FIG. 8 illustrates a method of obtaining, by the main controller 207 of FIG. 2, a reference vertical-line number and a reference horizontal-line number with respect to each of a plurality of preset partial blocks when one surveillance object region is set during a preset mode according to an exemplary embodiment. FIG. 9 is an exemplary reference captured image of a set surveillance object region for explaining operations S8014 and S8024 of FIG. 8. In FIG. 9, a reference numeral 901 denotes a reference captured image of a set surveillance object region. Reference codes $X_1$ to $X_{17}$ denote coordinates on an X axis of preset partial blocks, and reference codes $Y_1$ to $Y_{13}$ denote coordinates on a Y axis of the preset partial blocks. Depending on the case, a range of the reference captured image 901 may be a specific region, not an entire region of a frame. Referring to FIG. 9, the reference captured image 901 of the set surveillance object region is divided into 221 partial blocks. Also, the reference captured image 901 is divided into two portions including a peripheral portion and a central portion. Eight partial blocks are set in the peripheral portion, and three partial blocks are set in the central portion.

In FIG. 9, coordinates of the three partial blocks set in the central portion of the reference captured image 901 are given as follows:

$(X_4, Y_4), (X_7, Y_9), (X_{14}, Y_5)$

The three partial blocks in the central portion may be used for monitoring an abnormal illumination change due to instant entry of an object. Here, three partial blocks in an order based on a sum of edge values from high to low among all partial blocks of the central portion may be set for panning. Also, three partial blocks in an order based on a sum of edge values from high to low among all partial blocks of the central portion may be set for tilting.

Here, description of three partial blocks of the central portion is omitted for conciseness of description. That is, partial blocks to be directly used for correcting panning and/or tilting according to another exemplary embodiment are selected from the peripheral portion. This is because an error in a location of panning and/or tilting may be relatively greatly highlighted in the peripheral portion compared with the central portion. In FIG. 9, coordinates of the eight partial blocks set in the peripheral portion of the reference captured image 901 are given as follows:

$(X_1, Y_1), (X_2, Y_2), (X_4, Y_{13}), (X_8, Y_1), (X_{15}, Y_6), (X_{15}, Y_9), (X_{16}, Y_2), (X_{17}, Y_1)$

A method of setting the eight partial blocks in the peripheral portion of the reference captured image 901 is described with reference to FIG. 12.

A method of obtaining, at the main controller 207 of FIG. 2, a reference vertical-line number and a reference horizontal-line number with respect to each of a plurality of preset partial blocks when one surveillance object region is set during a preset mode according to another exemplary embodiment is described with reference to FIGS. 8 and 9.

Referring to FIG. 8, during a setting process of the preset mode, when a location coordinate of a central point of a surveillance object region is input by a user in operation S8001, the main controller 207 determines panning and/or tilting to be applied depending on the location coordinate in operation S8002.

In the case where only panning is performed, operations S8011 to S8014 are performed. In the case where only tilting is performed, operations S8021 to S8024 are formed. In the case where panning and tilting are performed, operations S8011 to S8014 and operations S8021 to S8024 are performed in a composite manner.

In operation S8011, the main controller 207 sets a pan angle corresponding to the input location coordinate. In operation S8012, the main controller 207 performs panning over the set pan angle. In operation S8013, the main controller 207 obtains an edge value with respect to each pixel of the plurality of set partial blocks in the reference captured image 901 of a panning-completed time, the edge value being a difference between brightness of a left adjacent pixel thereof and brightness of a right adjacent pixel thereof. In operation S8014, the main controller 207 obtains and stores a reference vertical-line number which is a number of a vertical pixel line in which sum of edge values is the largest among vertical pixel lines $V_1$ to $V_{1920}$ with respect to the plurality of set partial blocks.

In operation S8021, the main controller 207 sets a tilt angle corresponding to the input location coordinate. In operation S8022, the main controller 207 performs tilting over the set tilt angle. In operation S8023, the main controller 207 obtains an edge value with respect to each pixel of the plurality of set partial blocks in the reference captured image 901 of a tilting-completed time, the edge value being a difference between brightness of an upper adjacent pixel thereof and brightness of a lower adjacent pixel thereof. In operation S8024, the main controller 207 obtains and stores a reference horizontal-line number which is a number of a horizontal pixel line in which sum of edge values is the largest among horizontal pixel lines $H_1$ to $H_{1080}$ with respect to the plurality of set partial blocks.

Operations S8001 to S8024 are repeatedly performed until an end signal occurs in operation S8031. That is, a reference horizontal-line number and a reference vertical-line number are set with respect to each of a plurality of partial blocks of another surveillance object region.

Figure 10:
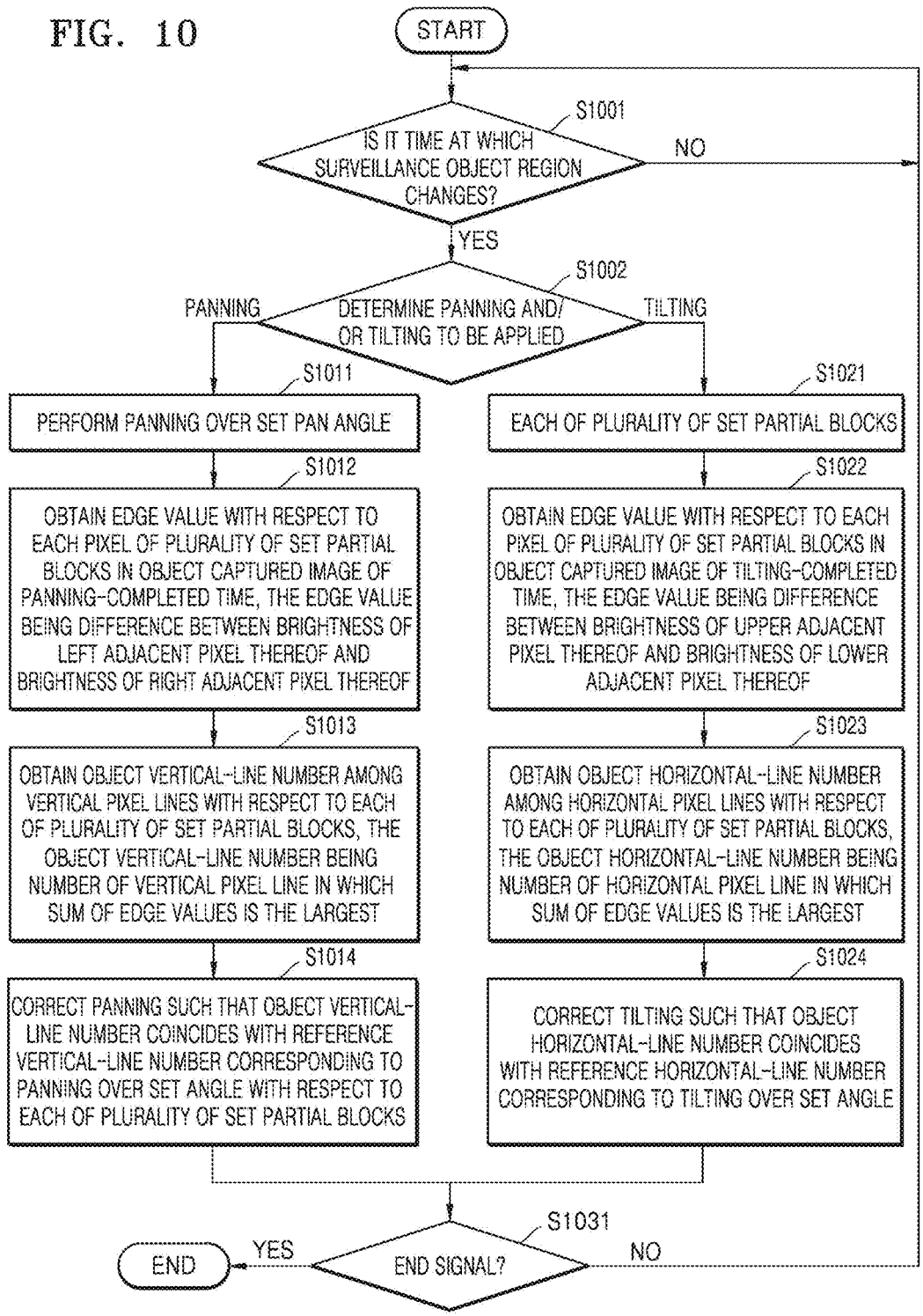
FIG. 10 is a flowchart of a method of controlling, at a main controller of FIG. 2, panning and tilting over set angles during a preset mode according to another exemplary embodiment.
Figure 11:
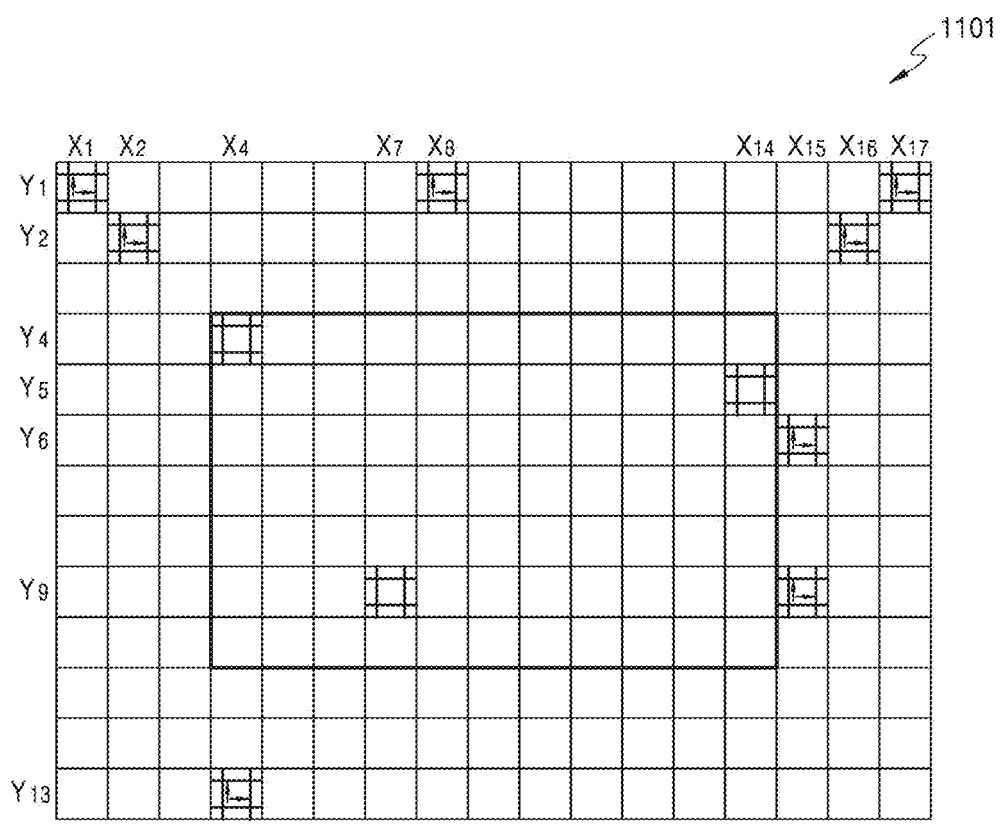
FIG. 11 is an exemplary object captured image of a panning-completed time and/or a tilting-completed time for explaining operations S1014 and S1024 of FIG. 10.

FIG. 10 illustrates a method of controlling, at the main controller 207 of FIG. 2, panning and tilting over set angles during a preset mode according to another exemplary embodiment. FIG. 11 is an exemplary object captured image of a panning-completed time and/or a tilting-completed time for explaining operations S1014 and S1024 of FIG. 10. In FIG. 11, a reference numeral 1101 denotes an object captured image of a panning-completed time and/or a tilting-completed time. In FIG. 11, the same reference numerals as those of FIG. 9 denote objects of the same functions. Depending on the case, a range of the object captured image 1101 may be a specific region, not an entire region of a frame.

A method of controlling, by the main controller 207 of FIG. 2, panning and tilting over set angles during a preset mode according to another exemplary embodiment is described with reference to FIGS. 10 and 11.

When a surveillance object region changes while the preset mode is executed in operation S1001, the main controller 207 determines panning and/or tilting to be applied depending on a location coordinate in operation S1002.

In the case where only panning is performed, operations S1011 to S1014 are performed. In the case where only tilting is performed, operations S1021 to S1024 are performed. In the case where panning and tilting are performed, operations S1011 to S1014 and operations S1021 to S1024 are performed in a composite manner.

In operation S1011, the main controller 207 performs panning over a set pan angle. In operation S1012, the main controller 207 obtains an edge value with respect to each pixel of the plurality of set partial blocks in the object captured image 1101 of a panning-completed time, the edge value being a difference between brightness of a left adjacent pixel thereof and brightness of a right adjacent pixel thereof. In operation S1013, the main controller 207 obtains an object vertical-line number which is a number of a vertical pixel line in which sum of edge values is the largest among vertical pixel lines, with respect to each of the plurality of set partial blocks. In operation S1014, the main controller 207 corrects panning such that the object vertical-line number coincides with the reference vertical-line number corresponding to the panning over the set angle with respect to the plurality of set partial blocks. That is, additional panning is performed such that an average vertical-line error in the plurality of set partial blocks is corrected. For reference, the reference vertical lines in FIG. 9 are illustrated at the same locations in FIG. 11.

In operation S1021, the main controller 207 performs tilting over a set tilt angle. In operation S1022, the main controller 207 obtains an edge value with respect to each pixel of a plurality of set partial blocks in the object captured image 1101 of a tilting-completed time, the edge value being a difference between brightness of an upper adjacent pixel thereof and brightness of a lower adjacent pixel thereof. In operation S1023, the main controller 207 obtains an object horizontal-line number which is a number of a horizontal pixel line in which sum of edge values is the largest among horizontal pixel lines with respect to each of the plurality of set partial blocks. In operation S1024, the main controller 207 corrects the tilting such that the object horizontal-line number coincides with the reference horizontal-line number corresponding to the tilting over the set angle. That is, additional tilting is performed such that an average horizontal-line error in the plurality of set partial blocks is corrected. For reference, the reference horizontal lines in FIG. 9 are illustrated at the same locations in FIG. 11.

Operations S1001 to S1024 are repeatedly performed until an end signal occurs in operation S1031. That is, panning and/or tilting are performed on another surveillance object region.

Figure 12:
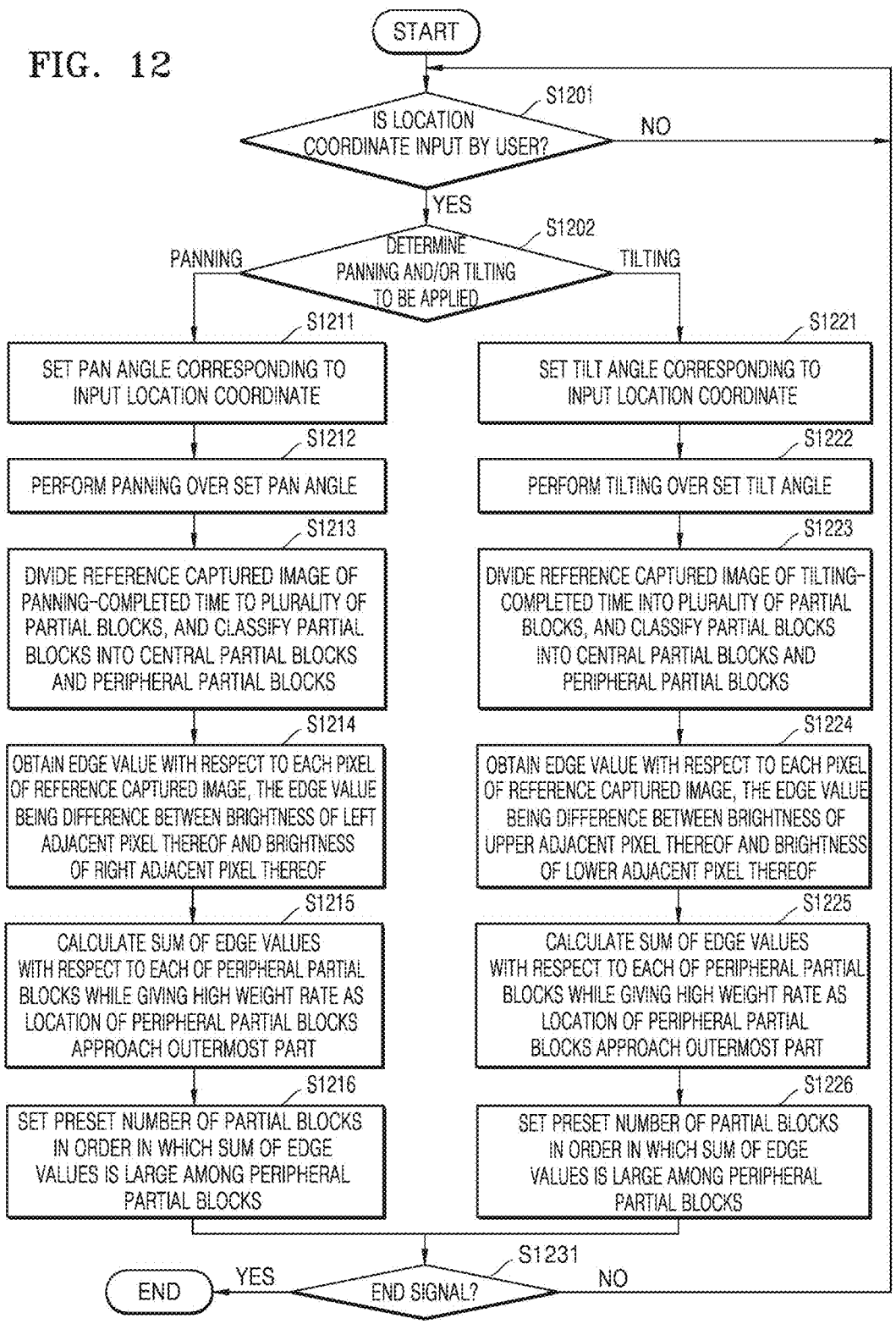
FIG. 12 is a flowchart of a method of setting, at a main controller of FIG. 2, a plurality of partial blocks to be applied to the method of FIGS. 8 and 10.

FIG. 12 illustrates a method of setting, by the main controller 207 of FIG. 2, a plurality of partial blocks to be applied to the method of FIGS. 8 and 10. The method of FIG. 12 described below with reference to FIGS. 9 and 12.

During a setting process of the preset mode, when a location coordinate of a central point of a surveillance object region is input by a user in operation S1201, the main controller 207 determines panning and/or tilting to be applied depending on the location coordinate in operation S1202.

In the case where only panning is performed, operations S1211 to S1216 are performed. In the case where only tilting is performed, operations S1221 to S1226 are performed. In the case where panning and tilting are performed, operations S1211 to S1216 and operations S1221 to S1226 are performed in a composite manner.

In operation S1211, the main controller 207 sets a pan angle corresponding to the input location coordinate. In operation S1212, the main controller 207 performs panning over the set pan angle. In operation S1213, the main controller 207 divides a reference captured image 901 of a panning-completed time into a plurality of partial blocks (221 partial blocks in FIG. 9), and classifies the partial blocks into central partial blocks and peripheral partial blocks. In operation S1214, the main controller 207 obtains an edge value with respect to each pixel of the reference captured image 901, the edge value being a difference between brightness of a left adjacent pixel thereof and brightness of a right adjacent pixel thereof.

In operation S1215, the main controller 207 calculates sum of edge values with respect to each of the peripheral partial blocks while giving a higher weight rate as a location of the peripheral partial blocks approaches an outermost part. This is because a location error of panning may be relatively greatly highlighted as a location of the peripheral partial blocks approaches an outermost part. In operation S1216, the main controller 207 sets a preset number (eight in FIG. 9) of partial blocks in an order in which sum of edge values change from high to low among the peripheral partial blocks.

Meanwhile, in operation S1221, the main controller 207 sets a tilt angle corresponding to the input location coordinate. In operation S1222, the main controller 207 performs tilting over the set tilt angle. In operation S1223, the main controller 207 divides the reference captured image 901 of a tilting-completed time into a plurality of partial blocks (221 partial blocks in FIG. 9), and classifies the partial blocks into central partial blocks and peripheral partial blocks. In operation S1224, the main controller 207 obtains an edge value of each pixel of the reference captured image 901, the edge value being a difference between brightness of an upper adjacent pixel thereof and brightness of a lower adjacent pixel thereof.

In operation S1225, the main controller 207 calculates sum of edge values with respect to each of the peripheral partial blocks while giving a high weight rate as a location of the peripheral partial blocks approaches an outermost part. This is because a location error of tilting may be relatively greatly highlighted as a location of the peripheral partial blocks approaches an outermost part. In operation S1226, the main controller 207 sets a preset number (eight in FIG. 9) of partial blocks in an order based on sum of edge values from high to low among the peripheral partial blocks.

Operations S1201 to S1226 are repeatedly performed until an end signal occurs in operation S1231. That is, partial blocks for panning control and/or partial blocks for tilting control are set with respect to each of a plurality of partial blocks of another surveillance object region.

Figure 13:
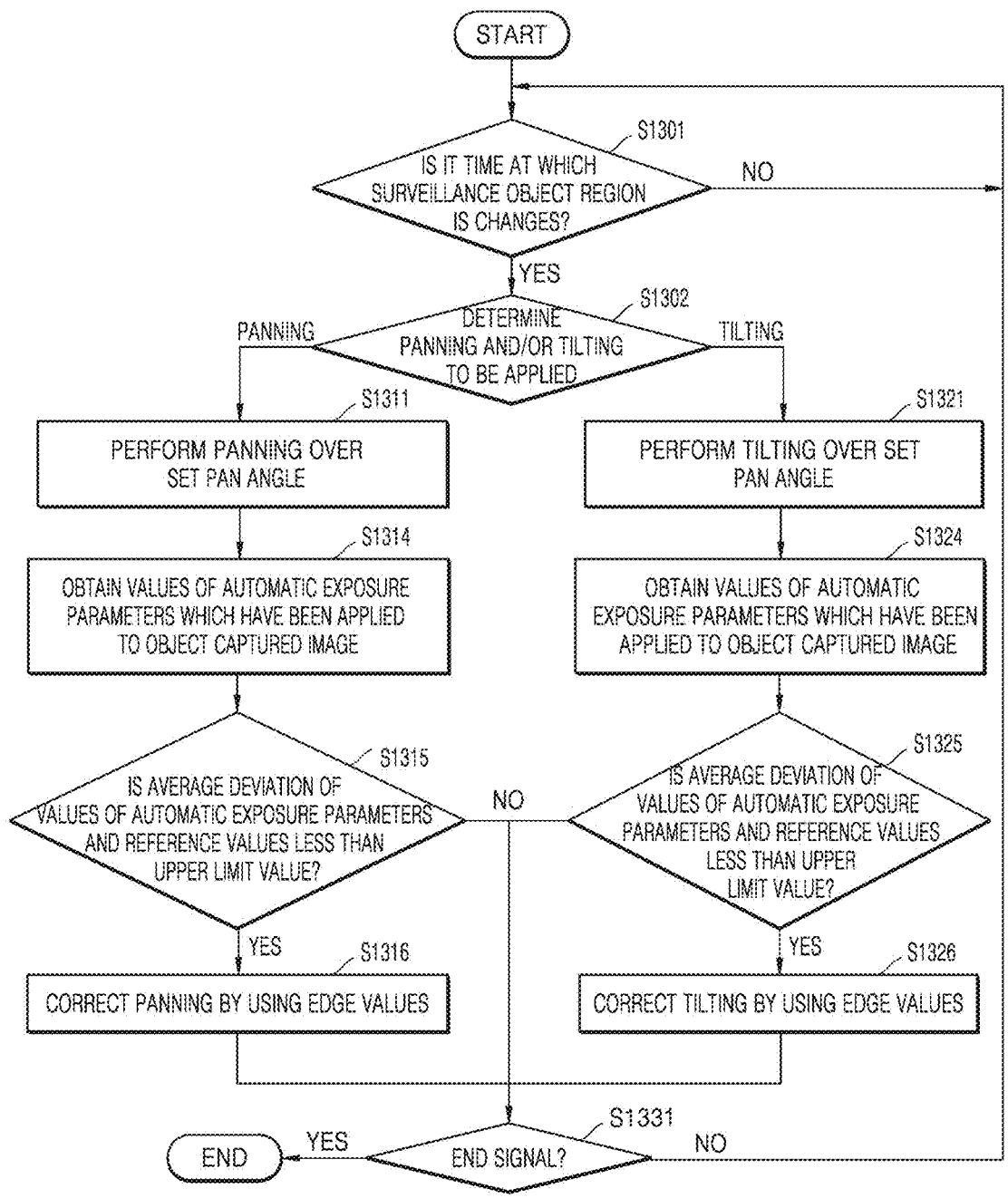
FIG. 13 is a flowchart of a method of controlling, at a main controller of FIG. 2, panning and tilting over set angles during a preset mode according to another exemplary embodiment.

FIG. 13 illustrates a method of controlling, at the main controller 207 of FIG. 2, panning and tilting over set angles during a preset mode according to another exemplary embodiment.

A method of controlling panning and tilting according to another exemplary embodiment is described with reference to FIG. 13.

When a surveillance object region changes while the preset mode is executed in operation S1301, the main controller 207 determines panning and/or tilting to be applied depending on a location coordinate in operation S1302.

In the case where only panning is performed, operations S1311 to S1316 are performed. In the case where only tilting is performed, operations S1321 to S1326 are performed. In the case where panning and tilting are performed, operations S1311 to S1316 and operations S1321 to S1326 are performed in a composite manner.

In operation S1311, the main controller 207 performs panning over a set pan angle. In operation S1314, the main controller 207 obtains values of automatic exposure parameters which have been applied to an object captured image of a panning-completed time. The automatic exposure parameters include a shutter speed, an output gain of the optic-electric converter OEC (see FIG. 2), and an aperture open degree.

In operation S1315, the main controller 207 determines whether an average deviation of the values of the automatic exposure parameters and reference values is less than an upper limit value. In operation S1316, when the average deviation is less than the upper limit value, since illumination has not changed abnormally, the main controller 207 corrects panning by using edge values. In operation S1316, operations S6012 to 6014 of FIG. 6 are performed, or operations S1012 to 1014 of FIG. 10 are performed.

Meanwhile, in operation S1321, the main controller 207 performs tilting over a set tilt angle. In operation S1324, the main controller 207 obtains values of automatic exposure parameters which have been applied to the object captured image of a tilting-completed time. The automatic exposure parameters include a shutter speed, an output gain of the optic-electric converter OEC (see FIG. 2), and an aperture open degree.

In operation S1325, the main controller 207 determines whether an average deviation of the values of the automatic exposure parameters and reference values is less than an upper limit value. In operation S1326, if the average deviation is less than the upper limit value, since illumination has not changed abnormally, the main controller 207 corrects tilting by using edge values. In operation S1326, operations S6022 to 6024 of FIG. 6 are performed, or operations S1022 to 1024 of FIG. 10 are performed.

Operations S1301 to S1326 are repeatedly performed until an end signal occurs in operation S1331. That is, panning and/or tilting are performed on another surveillance object region.

Therefore, according to the exemplary embodiment of FIG. 13, it may be prevented that correction of panning or tilting is abnormally performed when illumination changes abnormally. Here, it may be effectively known by using automatic exposure parameter values whether illumination abnormally changes. An example in which illumination abnormally changes may be a case where an unexpected new object is captured.

Figure 14:
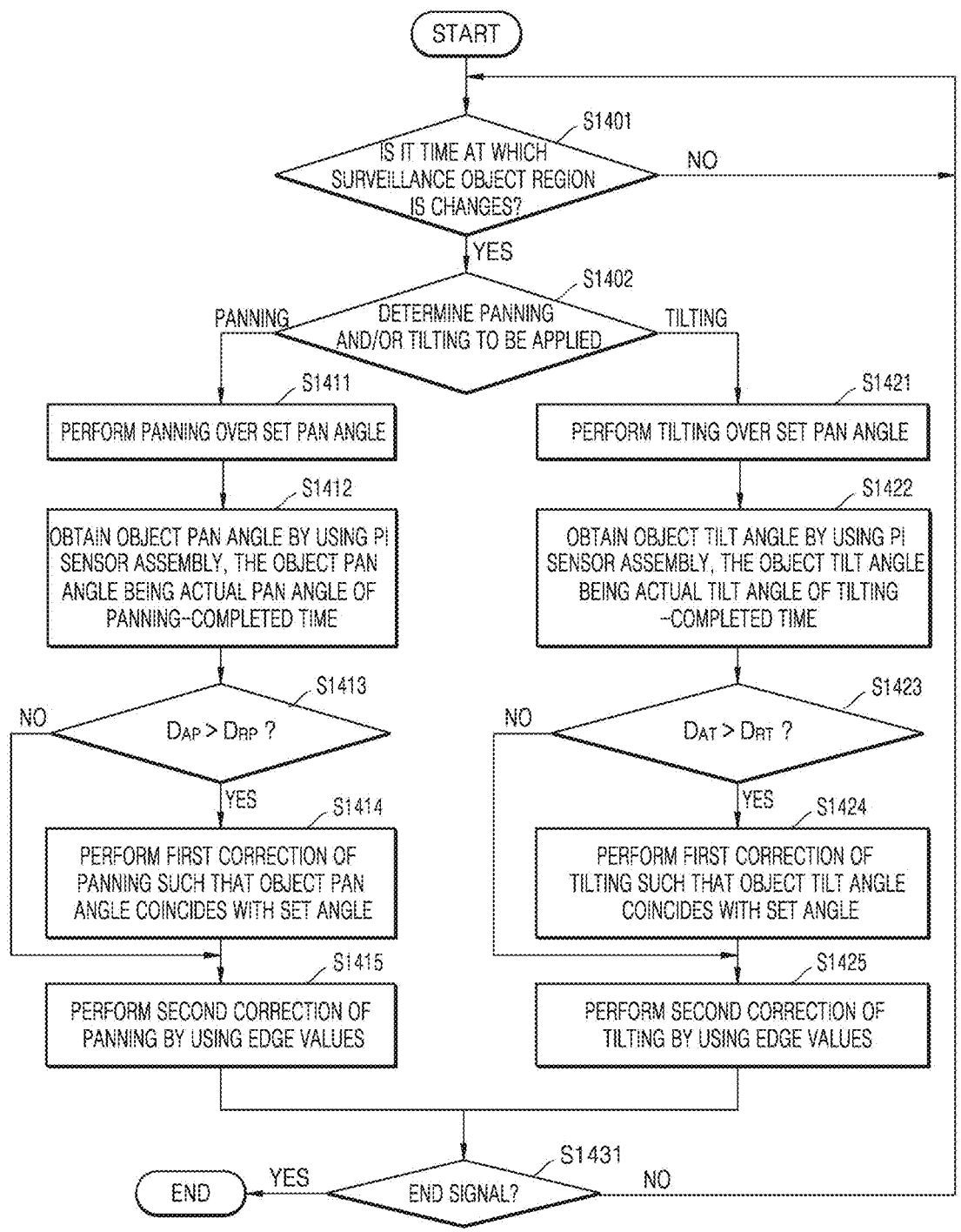
FIG. 14 is a flowchart of a method of controlling, at a main controller of FIG. 2, panning and tilting over set angles during a preset mode according to another exemplary embodiment.
Figure 15:
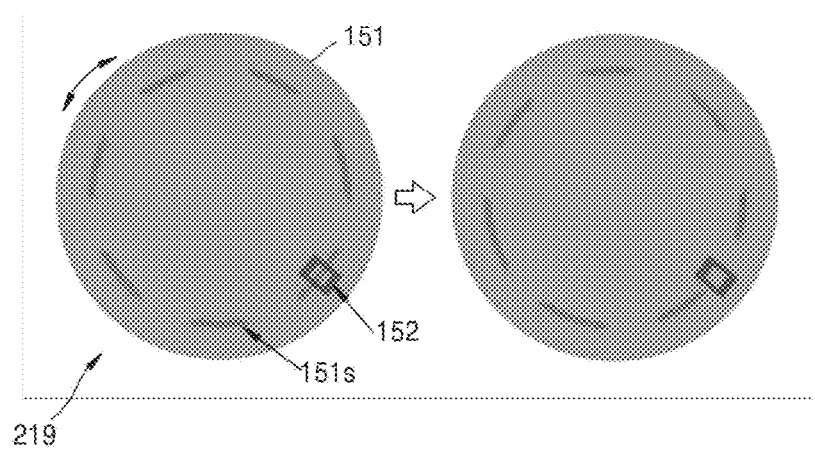
FIG. 15 is a plan view of PI sensor assembly for explaining operations S1412 to S1414 or S1422 to S1424 of FIG. 14.

FIG. 14 illustrates a method of controlling, by the main controller 207 of FIG. 2, panning and tilting over set angles during a preset mode according to another exemplary embodiment. FIG. 15 is a plan view of PI sensor assembly for explaining operations S1412 to S1414 or S1422 to S1424 of FIG. 14. In FIG. 15, a reference numeral 219 denotes a PI sensor assembly, a reference numeral 151 denotes a rotation plate, a reference numeral 151s denotes a slot, and a reference numeral 152 denotes a PI sensor. A method of controlling panning and tilting according to another exemplary embodiment is described with reference to FIGS. 14 and 15.

When a surveillance object region changes while the preset mode is executed in operation S1401, the main controller 207 determines panning and/or tilting to be applied depending on a location coordinate in operation S1402.

In the case where only panning is performed, operations S1411 to S1415 are performed. In the case where only tilting is performed, operations S1421 to S1425 are performed. In the case where panning and tilting are performed, operations S1411 to S1415 and operations S1421 to S1425 are performed in a composite manner.

In operation S1411, the main controller 207 performs panning over a set pan angle. In operation S1412, the main controller 207 obtains an object pan angle by using the PI sensor assembly 219, the object pan angle being an actual pan angle of a panning-completed time.

The PI assembly 219 includes a PI sensor assembly for panning and a PI sensor assembly for tilting, but description is made with each of the PI sensor assembly for panning and the PI sensor assembly for tilting, regarded as the PI assembly 219.

The PI sensor assembly for panning (e.g. 219) includes the rotation plate 151 and the PI sensor 152. The rotation plate 151 in which slits are arranged with a constant interval rotates depending on an operation of a panning mechanism. The PI sensor 152 senses a location of the rotation plate 151 and provides a binary signal to the main controller 207. For example, while the slit 151s is located in the PI sensor 152, the PI sensor 152 periodically outputs a "1" signal (a left state of FIG. 15). While the slit 151s is not located in the PI sensor 152, the PI sensor 152 periodically outputs a "0" signal (a right state of FIG. 15).

Accordingly, the main controller 207 obtains an object pan angle by using the PI sensor assembly 219, the object pan angle being an actual pan angle of a panning-completed time in operation S1412. Here, in the case where an out-of-phase occurs in operation S1413, the main controller 207 performs first correction of the panning such that the object pan angle coincides with the set pan angle in operation S1414. Occurrence of the out-of-phase means that a difference $D_{AP}$ between the object pan angle and the set pan angle exceeds a reference limit $D_{RP}$. When the out-of-phase does not occur, operation S1414 is not performed.

In operation S1415, the main controller 207 performs second correction of the panning by using edge values. Here, the second correction using the edge values is required because improvement in panning accuracy is limited even though the PI sensor assembly for panning 219 is additionally used.

In operation S1415, operations S6012 to S6014 of FIG. 6 are performed, or operations S1012 to S1014 of FIG. 10 are performed.

Meanwhile, in operation S1421, the main controller 207 performs tilting over a set tilt angle. In operation S1422, the main controller 207 obtains an object tilt angle by using the PI sensor assembly for tilting, the object tilt angle being an actual tilt angle of a tilting-completed time. Since the PI sensor assembly for tilting is equal to the PI sensor assembly for panning 219 described in operation S1412, description thereof is omitted.

Here, in the case where an out-of-phase occurs in operation S1423, the main controller 207 performs first correction of the tilting such that the object tilt angle coincides with the set tilt angle in operation S1424. Occurrence of the out-of-phase means that a difference $D_{AT}$ between the object tilt angle and the set tilt angle exceeds a reference limit $D_{RT}$. When the out-of-phase does not occur, operation S1424 is not performed.

In operation S1425, the main controller 207 performs second correction of the tilting by using edge values in operation S1425. Here, the second correction using the edge values is required because improvement in tilting accuracy is limited even though the PI sensor assembly for tilting 219 is additionally used.

In operation S1425, operations S6022 to S6024 of FIG. 6 are performed, or operations S1022 to S1024 of FIG. 10 are performed.

Operations S1401 to S1425 are repeatedly performed until an end signal occurs in operation S1431. That is, panning and/or tilting are performed on another surveillance object region.

According to another exemplary embodiment, since the first correction of panning or tilting is performed by using the PI sensor assembly 219, in the case where an out-of-phase occurs, time of the second correction using the edge values may be reduced. That is, a total correction time of panning or tilting may be reduced even more.

Figure 16:
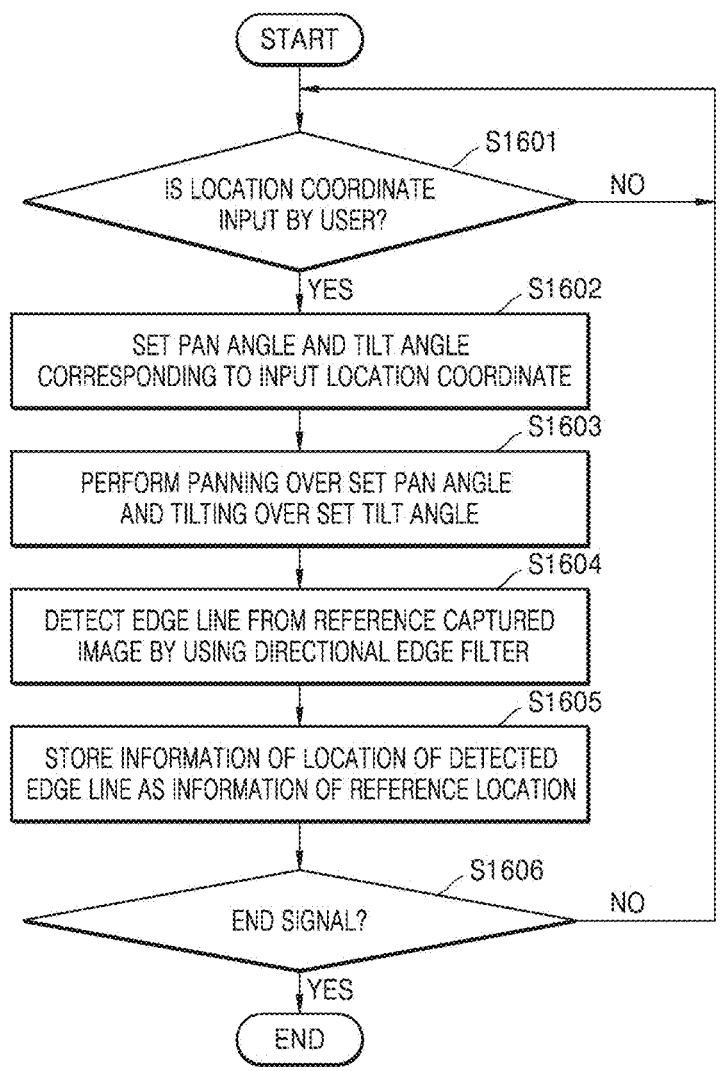
FIG. 16 is a flowchart showing that a main controller of FIG. 2 stores information of a reference location when one surveillance object region is set according to another exemplary embodiment.

FIG. 16 illustrates that the main controller 207 of FIG. 2 stores information of a reference location when one surveillance object region is set according to another exemplary embodiment.

Figure 17:
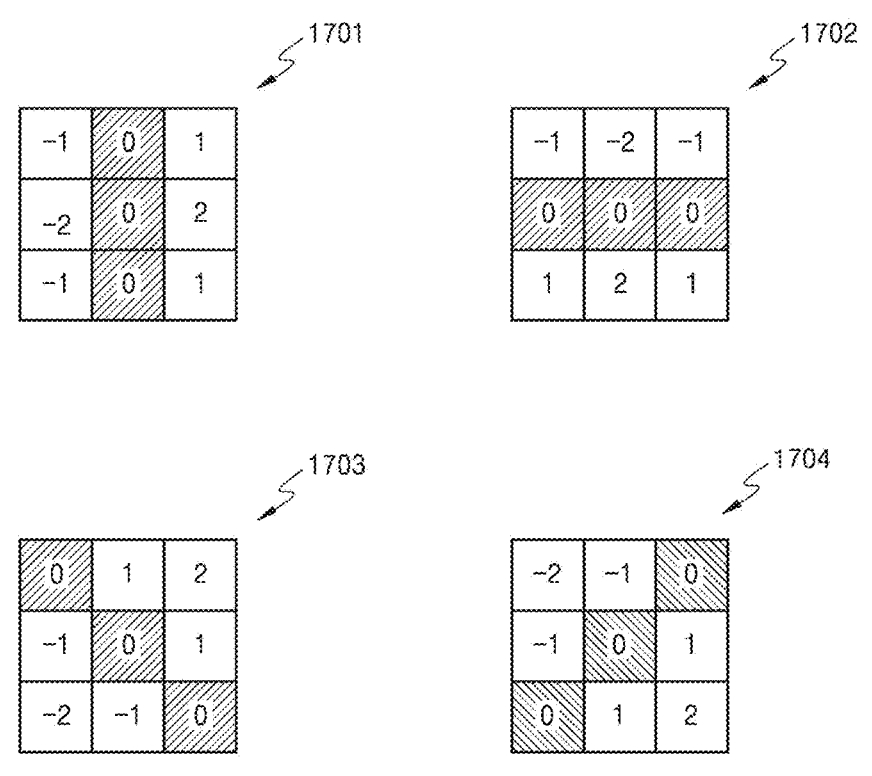

FIG. 17 illustrates masks for detecting an edge used in detection operation S1604 of FIG. 16. In FIG. 17, a reference numeral 1701 denotes a mask for detecting a vertical edge, a reference numeral 1702 denotes a mask for detecting a horizontal edge, a reference number 1703 denotes a mask for detecting a diagonal edge in a direction from an upper-left to a lower-right, and a reference numeral 1704 denotes a mask for detecting a diagonal edge in a direction from an upper-right to a lower-left.

Figure 18:
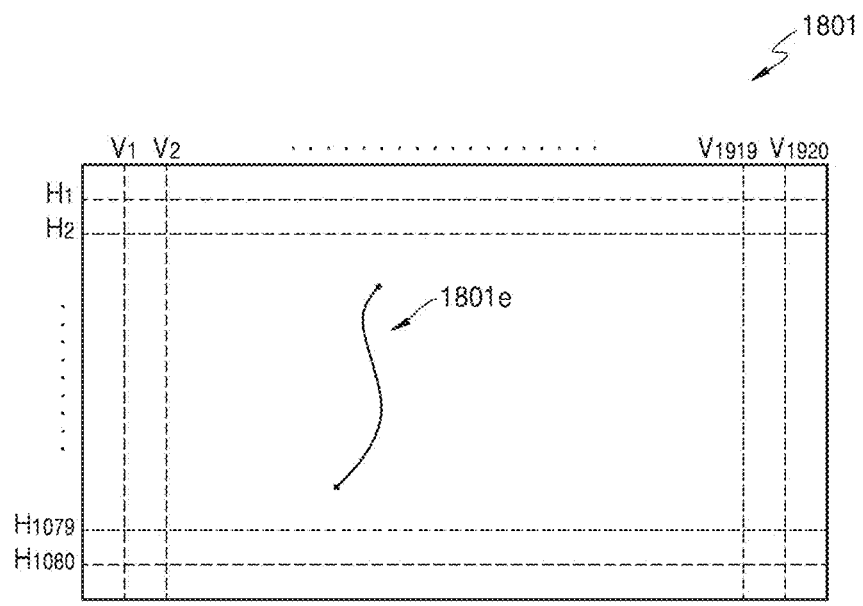
FIG. 18 is an exemplary edge line detected in detection operation S1604 of FIG. 16.

FIG. 18 illustrates an example of an edge line 1801e detected in detection operation S1604 of FIG. 16. The same reference numerals of FIG. 18 as those of FIG. 5 denote objects of the same functions.

Storing, at the main controller 207, the information of the reference location is described with reference to FIGS. 16 to 18.

When a location coordinate of a central point of a surveillance object region is input by a user in operation S1601, the main controller 207 sets a pan angle and a tilt angle corresponding to the input location coordinate in operation S1602. In operation S1603, the main controller 207 performs panning over the set pan angle and tilting over the set tilt angle.

When the panning and the tilting are completed, the main controller 207 detects the edge line 1801e from a reference captured image 1801 by using a directional edge filter in operation S1604. Depending on the case, a range of the reference captured image 801 may be a specific region, not an entire region of a frame.

In the present exemplary embodiment, a Sobel filter, which is well known as the directional edge filter, is used. When the Sobel filter is used, the mask 1701 for detecting a vertical edge, the mask 1702 for detecting a horizontal edge, the mask 1703 for detecting a diagonal edge in the direction from an upper-left to a lower-right, and the mask 1704 for detecting a diagonal edge in the direction from an upper-right to a lower-left are used. A most clear edge line 1801e among edge lines detected by the four masks 1701 to 1704 is selected as a reference edge line. That is, in the present exemplary embodiment, not only a horizontal or vertical edge line, but also a diagonal edge line is used.

Lastly, the main controller 207 stores location information of a detected edge line 2001e as information of a reference location in operation S1605. The stored information of the reference location is used for controlling panning and tilting afterward. Contents related thereto are described with reference to FIGS. 19 and 20.

Operations S1601 to S1605 are repeatedly performed until an end signal occurs in operation S1606.

Figure 19:
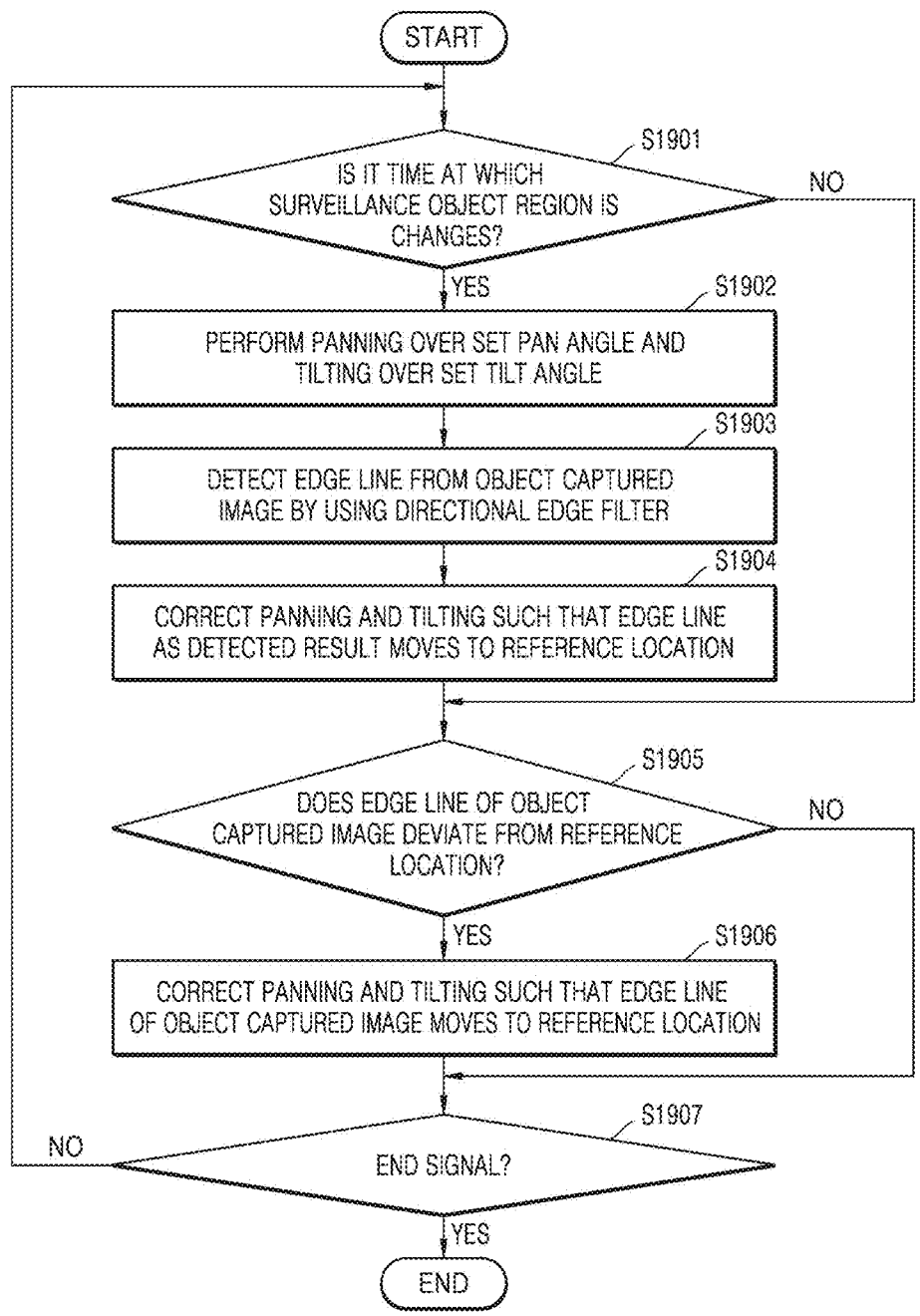
FIG. 19 is a flowchart of a method of controlling, at a main controller of FIG. 2, panning and tilting according to another exemplary embodiment.

FIG. 19 illustrates a method of controlling, at the main controller 207 of FIG. 2, panning and tilting according to another exemplary embodiment.

Figure 20:
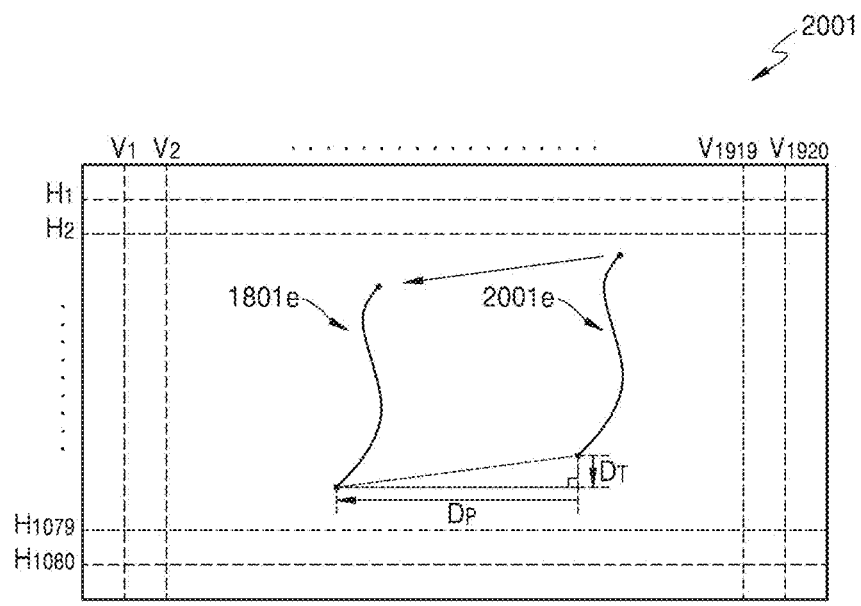
FIG. 20 is an illustration for explaining correction operations S1904 and S1906 of FIG. 19.

FIG. 20 is an illustration for explaining correction operations S1904 and S1906 of FIG. 19. The same reference numerals of FIG. 20 as those of FIG. 18 denote objects of the same functions.

A process of controlling panning and tilting according to another exemplary embodiment is described with reference to FIGS. 19 and 20.

The main controller 207 determines a time whether a surveillance object region changes in operation S1901.

In operation S1902, the main controller 207 performs panning over a set pan angle and tilting over a set tilt angle.

When the panning and the tilting are completed, the main controller 207 detects the edge line 2001e from the object captured image 2001 by using the directional edge filter in operation S1903. Depending on the case, a range of the reference captured image 1801 may be a specific region, not an entire region of a frame.

Operation S1903 is performed as described in detail in operation S1604. Only a mask which has generated the reference edge line 1801e among the four masks 1701 to 1704 (see FIG. 17) may be used in operation S1903.

In operation S1904, the main controller 207 corrects panning and tilting such that the edge line 2001e as the detected result moves to the reference location. Here, the reference location is a location of the detected edge line 1801e detected from the reference captured image 1801 (see FIG. 18). That is, operation S1904 is performed according to the information of the reference location stored in operation S1605 (see FIG. 16). For example, the panning is corrected by a horizontal error $D_P$, and the tilting is corrected by a vertical error $D_T$.

Even though the panning and the tilting are corrected, an out-of-phase of the panning or tilting may be generated due to an external factor with time. In this case, the edge line of the object captured image 2001 may deviate from the reference location. Also, in the case where an image is recovered to the original multiplication after zooming is performed, the edge line of the object captured image 2001 may deviate from the reference location.

Therefore, the main controller 207 determines whether the edge line of the object captured image 2001 deviates from the reference location in operation S1905.

When the edge line 2001e deviates from the reference location, the main controller 207 corrects panning and tilting such that the edge line of the object captured image moves to the reference location in operation S1906.

Operations S1901 to S1906 are periodically performed until an end signal occurs in operation S1907. For example, since operation S1905 is periodically performed, whether the edge line of the object captured image 2001 deviates from the reference location is periodically determined.

Figure 21:
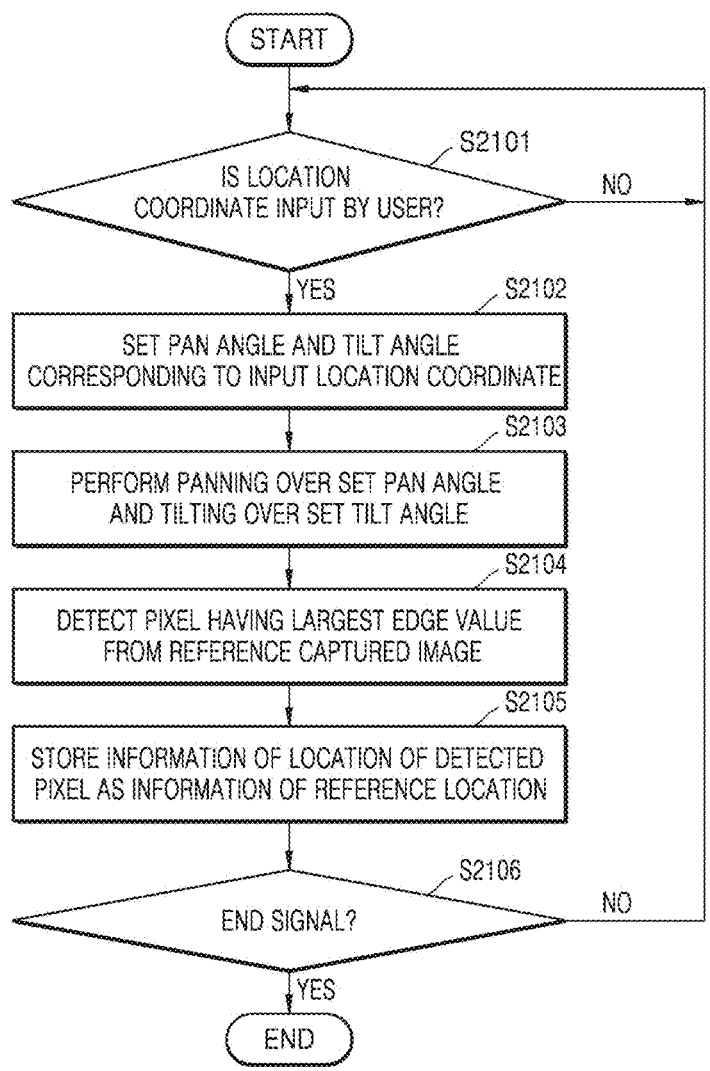
FIG. 21 is a flowchart showing that a main controller of FIG. 2 stores information of a reference location when one surveillance object region is set according to another exemplary embodiment.

FIG. 21 is a flowchart showing that the main controller 207 of FIG. 2 stores information of a reference location when one surveillance object region is set according to another exemplary embodiment.

Figure 22:
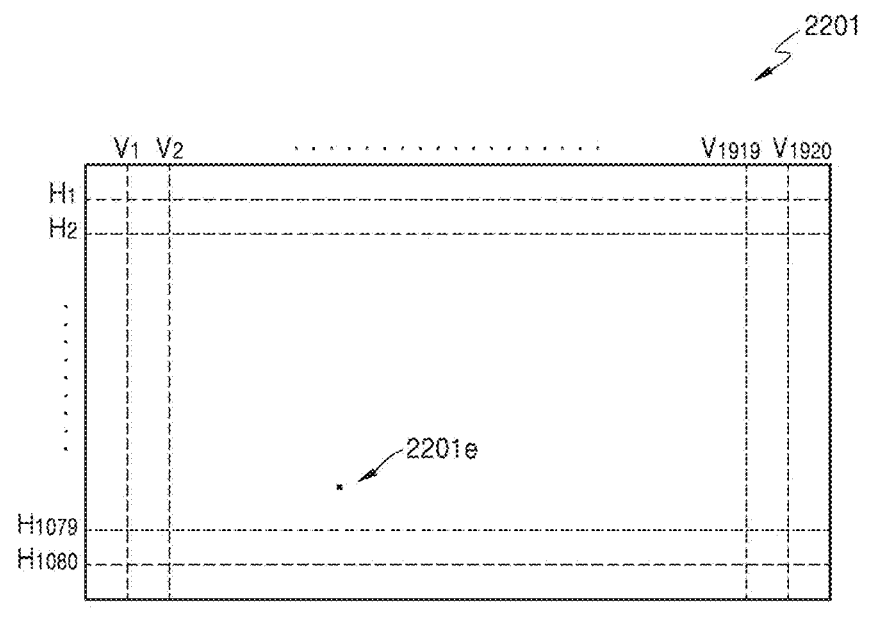

FIG. 22 illustrates an example of a pixel 2201e detected in detection operation S2104 of FIG. 21. In FIG. 22, the same reference numerals as those of FIG. 5 denote objects of the same functions.

Storing, at the main controller 207, the information of the reference location is described with reference to FIGS. 21 and 22.

When a location coordinate of a central point of a surveillance object region is input by a user in operation S2101, the main controller 207 sets a pan angle and a tilt angle corresponding to the input location coordinate in operation S2102. In operation S2103, the main controller 207 performs panning over the set pan angle and tilting over the set tilt angle.

When the panning and the tilting are completed, the main controller 207 detects the pixel 2201e having a largest edge value from a reference captured image 2201 in operation S2104. Depending on the case, a range of the reference captured image 2201 may be a specific region, not an entire region of a frame.

In the present exemplary embodiment, a Sobel filter, which is well known as the directional edge filter, is used. As shown in FIG. 17, when the Sobel filter is used, the mask 1701 used for detecting a vertical edge, the mask 1702 is used for detecting a horizontal edge, the mask 1703 is used for detecting a diagonal edge in the direction from an upper-left to a lower-right, and the mask 1704 is used for detecting a diagonal edge in the direction from an upper-right to a lower-left. For example, an edge value of one pixel may be sum of a vertical edge value, a horizontal edge value, a diagonal edge value in the direction from an upper-left to a lower-right, and a diagonal edge value in the direction from an upper-right to a lower-left. Only one of the masks may be used depending on a characteristic of the reference captured image 2201.

Lastly, the main controller 207 stores information of a location of the detected pixel 2201e as information of a reference location in operation S2105. The stored information of the reference location is used for controlling panning and tilting afterward. Contents related thereto are described with reference to FIGS. 23 and 24.

Operations S2101 to 2105 are repeatedly performed until an end signal occurs in operation S2106.

Figure 23:
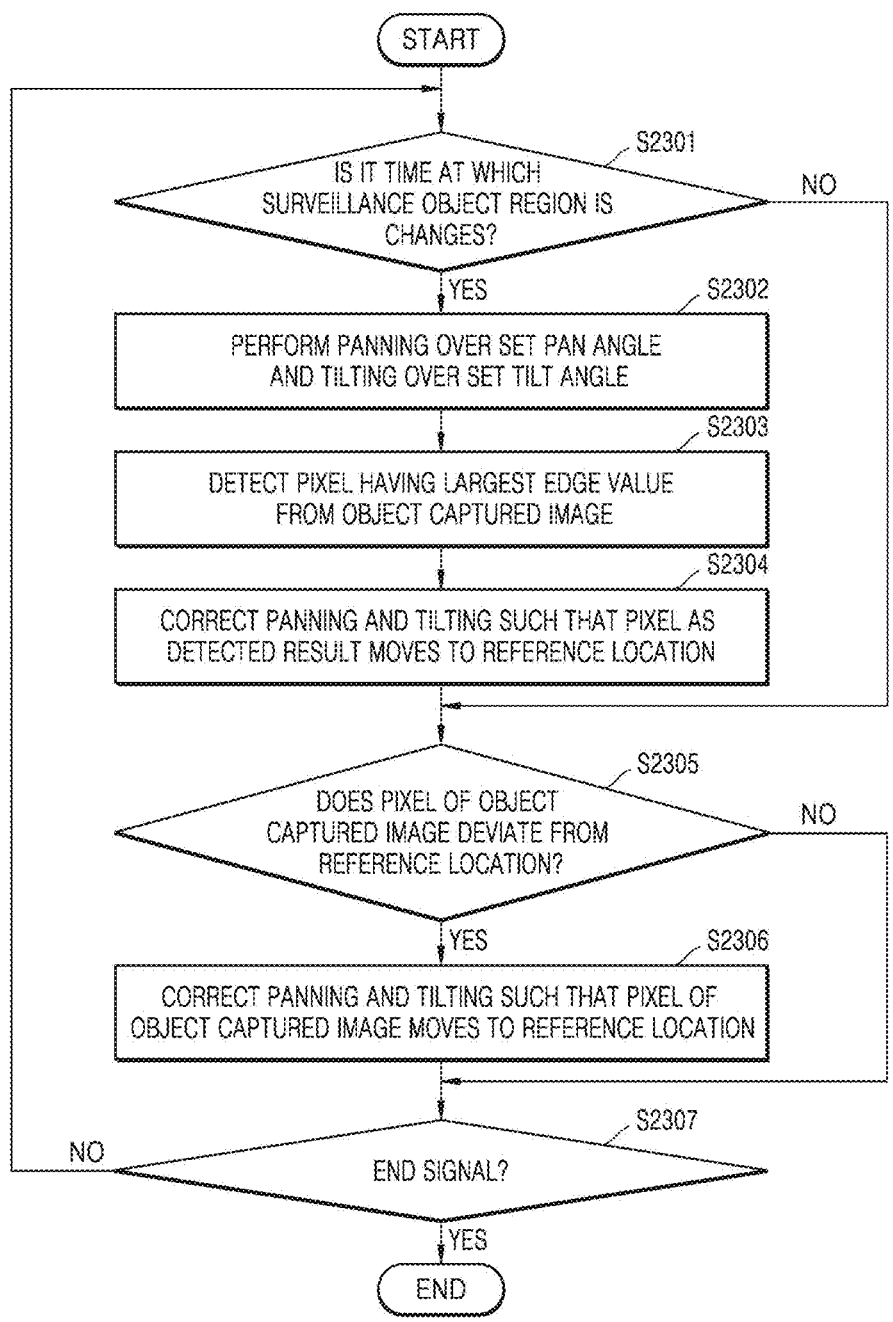
FIG. 23 is a flowchart of a method of controlling, at a main controller of FIG. 2, panning and tilting according to another exemplary embodiment.

FIG. 23 is a flowchart of a method of controlling, at the main controller 207 of FIG. 2, panning and tilting according to another exemplary embodiment.

Figure 24:
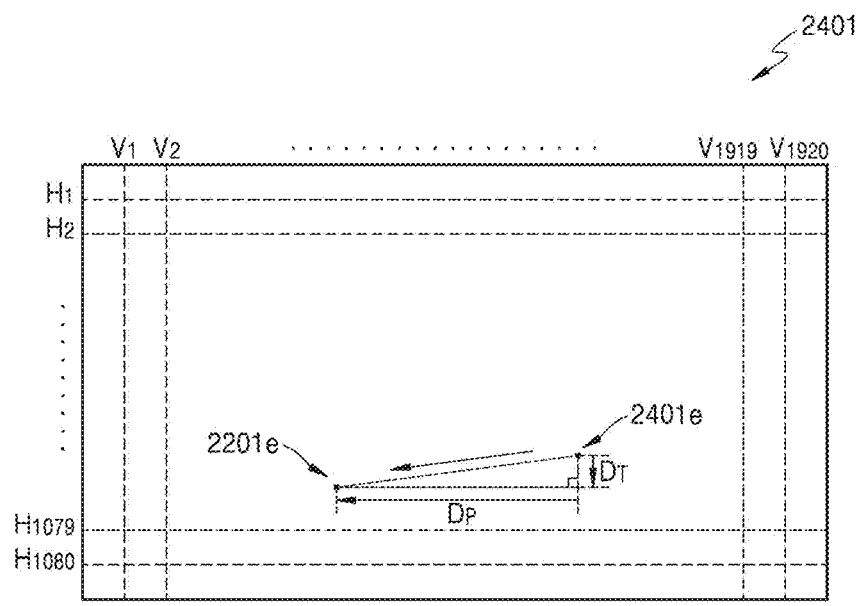
FIG. 24 is an illustration for explaining correction operations S2304 and S2306 of FIG. 23.

FIG. 24 is a view for explaining correction operations S2304 and S2306 of FIG. 23. In FIG. 24, the same reference numerals as those of FIG. 22 denote objects of the same functions.

A process of controlling panning and tilting according to another exemplary embodiment is described with reference to FIGS. 23 and 24.

The main controller 207 determines a time whether a surveillance object region changes in operation S2301.

In operation S2303, the main controller 207 performs panning over a set pan angle and tilting over a set tilt angle.

When the panning and the tilting are completed, the main controller 207 detects a pixel 2401e having a largest edge value from an object captured image 2401 in operation S2303. Depending on the case, a range of the object captured image 2401 may be a specific region, not an entire region of a frame. Operation S2303 is performed as described in detail in operation S2104.

In operation S2304, the main controller 207 performs panning and tilting such that the pixel 2401e as the detected result moves to a reference location. Here, the reference location is a location of the pixel 2201e detected from the reference captured image 2201 (see FIG. 22). That is, operation S2304 is performed according to the information of the reference location stored in operation S2105 (see FIG. 21). For example, panning is corrected by the horizontal error $D_P$, and tilting is corrected by the vertical error $D_T$.

Even though the panning and the tilting are corrected, an out-of-phase of the panning or tilting may be generated due to an external factor with time. In this case, the pixel of the object captured image 2401 may deviate from the reference location. Also, in the case where the object captured image 2401 is recovered to the original multiplication after zooming is performed, the pixel of the object captured image 2401 may deviate from the reference location.

Therefore, the main controller 207 determines whether the pixel of the object captured image 2401 deviates from the reference location in operation S2305.

When the pixel 2401e deviates from the reference location, the main controller 207 corrects the panning and the tilting such that the pixel of the object captured image 2401 moves to the reference location in operation S2306.

Operations S2301 to S2306 are periodically performed until an end signal occurs in operation S2307. For example, since operation S2305 is periodically performed, whether the pixel of the object captured image 2401 deviates from the reference location is periodically determined.

As described above, according to the method of controlling panning of the present exemplary embodiments, panning and/or tilting are corrected by using edge values. Therefore, accuracy of the panning and/or tilting may be improved by an additional simple operation.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of controlling a surveillance camera, the method comprising:
    selecting at least one pixel in a reference image, based on edge values of pixels in the reference image of a surveillance region;
    detecting at least one pixel in an object-captured image, based on edge values of pixels in the object-captured image, which is captured after at least one of panning and tilting is completed to the surveillance region; and
    correcting the at least one of the panning and the tilting in the object-captured image by moving the at least one pixel in the object-captured image to a reference location of the at least one pixel in the reference image.

2. The method of claim 1,
wherein:
    the detecting the at least one pixel in an object-captured image comprises:
        obtaining an edge value with respect to each pixel of the object-captured image of a panning-completed time, wherein the edge value is a difference between brightness of a left adjacent pixel thereof and brightness of a right adjacent pixel thereof; and
        obtaining an object vertical-line number which is a number of a vertical pixel line in which a sum of the edge values is largest among vertical pixel lines of the object-captured image; and
    the correcting the at least one of the panning and the tilting comprises correcting the panning in the object-captured image by moving the object vertical-line to a reference vertical-line obtained by the at least one pixel selected in the reference image.

3. The method of claim 1,
wherein:
    the detecting the at least one pixel in an object-captured image comprises:
        obtaining an edge value with respect to each pixel of a plurality of preset partial blocks of the object-captured image of a panning-completed time, wherein the edge value is a difference between brightness of a left adjacent pixel thereof and brightness of a right adjacent pixel thereof; and
        obtaining an object vertical-line with respect to each of the plurality of preset partial blocks, the object vertical-line being a vertical pixel line in which a sum of the edge values is largest among vertical pixel lines; and
    the correcting the at least one of the panning and tilting comprises correcting the panning in the object-captured image by moving the object vertical-line to a reference vertical-line obtained by the at least one pixel selected with respect to a preset number of partial blocks among the plurality of partial blocks of the reference image.

4. The method of claim 3, further comprising:
    dividing the reference image into the plurality of partial blocks, and classifying the plurality of partial blocks into central partial blocks and peripheral partial blocks;
    obtaining an edge value with respect to each pixel of the reference image of the panning-completed time, wherein the edge value is a difference between brightness of a left adjacent pixel thereof and brightness of a right adjacent pixel thereof;
    calculating a sum of the edge values of each of the peripheral partial blocks while giving a high weight rate as a location of the peripheral partial blocks approaches an outermost part; and setting the preset number of partial blocks in an order based on the sum of the edge values from high to low among the peripheral partial blocks.

5. The method of claim 1, further comprising:
when the panning is completed, obtaining values of automatic exposure parameters which have been applied to an object-captured image,
wherein:
the detecting the at least one pixel in an object-captured image comprises:
when an average deviation of the values of the automatic exposure parameters and reference values is less than an upper limit value, obtaining an edge value with respect to each pixel of the object-captured image, wherein the edge value is a difference between brightness of a left adjacent pixel thereof and brightness of a right adjacent pixel thereof; and
obtaining an object vertical-line which is a vertical pixel line in which a sum of the edge values is largest among vertical pixel lines of the object-captured image; and
the correcting the at least one of the panning and the tilting comprises correcting the panning in the object-captured image by moving the object vertical-line to a reference vertical-line obtained by the at least one pixel selected in the reference image.

6. The method of claim 1, further comprising:
obtaining an object pan angle by using a photo interrupter sensor assembly, wherein the object pan angle is an actual pan angle of a panning-completed time, when the panning is completed to the surveillance region; and
when a difference between the object pan angle and the set angle exceeds a reference limit, performing first correction of the panning such that the object pan angle coincides with the set angle
wherein:
the detecting the at least one pixel in an object-captured image comprises:
obtaining an edge value with respect to each pixel of the object-captured image, wherein the edge value is a difference between brightness of a left adjacent pixel thereof and brightness of a right adjacent pixel thereof; and
obtaining an object vertical-line which is a vertical pixel line in which sum of the edge values is largest among vertical pixel lines of the object-captured image; and
the correcting the at least one of the panning and tilting comprises performing second correction of the panning in the object-captured image by moving the object vertical-line to a reference vertical-line obtained by the at least one pixel selected in the reference image.

7. The method of claim 1, further comprising:
wherein:
the detecting the at least one pixel in an object-captured image comprises:
obtaining an edge value with respect to each pixel of the object-captured image of a tilting-completed time, wherein the edge value is a difference between brightness of an upper adjacent pixel thereof and brightness of a lower adjacent pixel thereof; and
obtaining an object horizontal-line which is a horizontal pixel line in which a sum of the edge values is largest among horizontal pixel lines of the object-captured image; and the correcting the at least one of the panning and the tilting comprises correcting the tilting in the object-captured image by moving the object horizontal-line to a reference horizontal-line obtained by the at least one pixel selected in the reference image.

8. The method of claim 1,
wherein:
the detecting the at least one pixel in an object-captured image comprises:
obtaining an edge value with respect to each pixel of a plurality of preset partial blocks of the object-captured image of a tilting-completed time, wherein the edge value is a difference between brightness of an upper adjacent pixel thereof and brightness of a lower adjacent pixel thereof; and
obtaining an object horizontal-line number with respect to each of the plurality of preset partial blocks, wherein the object horizontal-line is a horizontal pixel line in which a sum of the edge values is largest among horizontal pixel lines; and
the correcting the at least one of the panning and the tilting comprises correcting the tilting in the object-captured image by moving the object horizontal-line to a reference horizontal-line obtained by the at least one pixel selected with respect to a preset number of partial blocks among the plurality of partial blocks of the reference image.

9. The method of claim 8, further comprising:
dividing the reference image into the plurality of partial blocks, and classifying the plurality of partial blocks into central partial blocks and peripheral partial blocks;
obtaining an edge value with respect to each pixel of the reference image, wherein the edge value is a difference between brightness of an upper adjacent pixel thereof and brightness of a lower adjacent pixel thereof;
calculating a sum of the edge values of each of the peripheral partial blocks while giving a high weight rate as a location of the peripheral partial blocks approaches an outermost part; and
setting the preset number of partial blocks in an order based on the sum of the edge values from high to low among the peripheral partial blocks.

10. The method of claim 1, further comprising:
when the tilting is completed to the surveillance region, obtaining values of automatic exposure parameters which have been applied to an object-captured image,
wherein:
the detecting the at least one pixel in an object-captured image comprises:
when an average deviation of the values of the automatic exposure parameters and reference values is less than an upper limit value, obtaining an edge value with respect to each pixel of the object-captured image, wherein the edge value is a difference between brightness of an upper adjacent pixel thereof and brightness of a lower adjacent pixel thereof; and
obtaining an object horizontal-line which is a horizontal pixel line in which a sum of the edge values is largest among horizontal pixel lines of the object-captured image; and
the correcting the at least one of the panning and tilting comprises correcting the tilting in the object-captured image by moving the object horizontal-line to a reference horizontal-line obtained by the at least one pixel selected in the reference image.

11. The method of claim 1, further comprising:
obtaining an object tilt angle by using a photo interrupter sensor assembly, the object tilt angle being an actual tilt angle of a tilting-completed time, when the tilting is completed to the surveillance region; and
when a difference between the object tilt angle and the set angle exceeds a reference limit, performing first correction of the tilting such that the object tilt angle coincides with the set angle,
wherein:
the detecting the at least one pixel in an object-captured image comprises:
  obtaining an edge value with respect to each pixel of the object-captured image, wherein the edge value is a difference between brightness of an upper adjacent pixel thereof and brightness of a lower adjacent pixel thereof; and
  obtaining an object horizontal-line which is a horizontal pixel line in which a sum of edge values is largest among horizontal pixel lines of the object-captured image; and
the correcting the at least one of the panning and tilting comprises performing second correction of the tilting in the object-captured image by moving the object horizontal-line to a reference horizontal-line obtained by the at least one pixel selected in the reference image.

12. The method of claim 1,
wherein:
the detecting the at least one pixel in an object-captured image comprises, when the panning and tilting are completed to the surveillance region, detecting an edge line by selecting the at least one pixel from the object-captured image; and
the correcting the at least one of the panning and tilting comprises correcting the panning and the tilting in the object-captured image by moving the detected edge line to a reference location of a reference edge line generated by selecting the at least one pixel in the reference image.

13. The method of claim 12, further comprising:
after the panning and the tilting are corrected, periodically determining whether the edge line of the object-captured image deviates from the reference location; and
when the edge line of the object-captured image deviates from the reference location, correcting the panning and the tilting by moving the edge line to the reference location.

14. The method of claim 1,
wherein:
the detecting the at least one pixel in an object-captured image comprises, when the panning and the tilting are completed, detecting a pixel having a largest edge value from an object-captured image; and
the correcting the at least one of the panning and the tilting comprises correcting the panning and the tilting by moving the detected pixel to a reference location of the at least one pixel selected in the reference image.

* * * * *